(12) United States Patent
Sugiura

(10) Patent No.: US 12,413,815 B2
(45) Date of Patent: Sep. 9, 2025

(54) INFORMATION PROCESSING DEVICE AND INFORMATION PROCESSING METHOD

(71) Applicant: SATURN LICENSING LLC, New York, NY (US)

(72) Inventor: Shunichi Sugiura, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 180 days.

(21) Appl. No.: 18/041,647

(22) PCT Filed: Aug. 18, 2021

(86) PCT No.: PCT/JP2021/030145
§ 371 (c)(1),
(2) Date: Feb. 14, 2023

(87) PCT Pub. No.: WO2022/044904
PCT Pub. Date: Mar. 3, 2022

(65) Prior Publication Data
US 2023/0328319 A1   Oct. 12, 2023

(30) Foreign Application Priority Data
Aug. 28, 2020   (JP) ................................ 2020-145069

(51) Int. Cl.
*H04N 21/45* (2011.01)
*H04N 21/431* (2011.01)
*H04N 21/482* (2011.01)

(52) U.S. Cl.
CPC ..... *H04N 21/4532* (2013.01); *H04N 21/4312* (2013.01); *H04N 21/482* (2013.01)

(58) Field of Classification Search
CPC .......... H04N 21/4512; H04N 21/4532; H04N 21/482
See application file for complete search history.

(56) References Cited

U.S. PATENT DOCUMENTS

| 2003/0163812 A1* | 8/2003 | Tsukamoto ........ H04N 21/4345 725/50 |
| 2003/0163817 A1 | 8/2003 | Han |
| 2007/0169148 A1 | 7/2007 | Oddo et al. |

(Continued)

FOREIGN PATENT DOCUMENTS

| JP | 2010-263510 A | 11/2010 |
| JP | 2016-086342 A | 5/2016 |
| WO | 2020/121776 A1 | 6/2020 |

OTHER PUBLICATIONS

International Search Report and Written Opinion of PCT Application No. PCT/JP2021/030145, issued on Nov. 9, 2021, 09 pages of ISRWO.

*Primary Examiner* — Nicholas T Corbo
(74) *Attorney, Agent, or Firm* — Richard LaPeruta

(57) ABSTRACT

An information processing device (100) according to an aspect of the present disclosure includes a control unit (160) configured to perform a process of acquiring content selection information about a user; a process of determining a display content and content selection candidate information based on the content selection information; and a process of outputting the display content and a first display image corresponding to the selection candidate information of the content.

20 Claims, 23 Drawing Sheets

(56) References Cited

U.S. PATENT DOCUMENTS

| | | |
|---|---|---|
| 2009/0165052 A1* | 6/2009 | Lee .................... H04N 21/4821 |
| | | 725/40 |
| 2010/0313172 A1 | 12/2010 | Hirahara |
| 2010/0333137 A1 | 12/2010 | Hamano et al. |
| 2014/0053198 A1* | 2/2014 | Sirpal ................ H04N 21/4821 |
| | | 725/43 |
| 2016/0088358 A1 | 3/2016 | Navarro |
| 2016/0127791 A1 | 5/2016 | Roberts et al. |

* cited by examiner

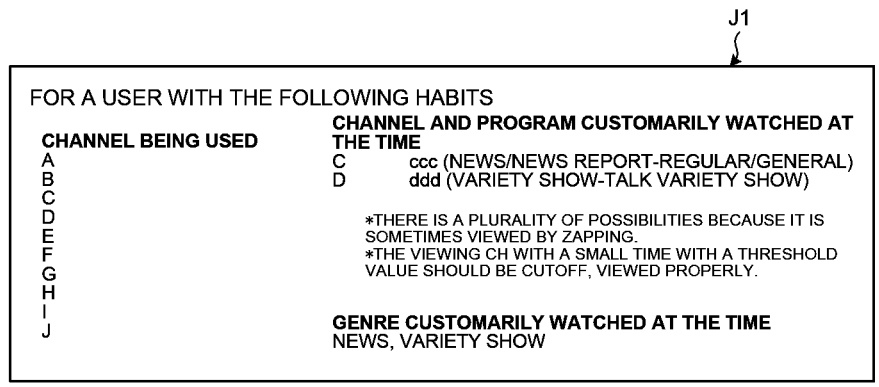

FOR A USER WITH THE FOLLOWING HABITS

CHANNEL BEING USED
A
B
C
D
E
F
G
H
I
J

CHANNEL AND PROGRAM CUSTOMARILY WATCHED AT THE TIME
C     ccc (NEWS/NEWS REPORT-REGULAR/GENERAL)
D     ddd (VARIETY SHOW-TALK VARIETY SHOW)

∗THERE IS A PLURALITY OF POSSIBILITIES BECAUSE IT IS SOMETIMES VIEWED BY ZAPPING.
∗THE VIEWING CH WITH A SMALL TIME WITH A THRESHOLD VALUE SHOULD BE CUTOFF, VIEWED PROPERLY.

GENRE CUSTOMARILY WATCHED AT THE TIME
NEWS, VARIETY SHOW

WHEN THIS PROGRAM COMES ···
A     aaa (SPORTS-MARINE WINTER SPORTS)
B     bbb (NEWS/SPECIAL ARTICLE/DOCUMENTARY)
C     ccc (NEWS/NEWS REPORT-REGULAR/GENERAL)
D     ddd (VARIETY SHOW-TALK VARIETY SHOW)    ← J2
E     eee (VARIETY SHOW-COMEDY)
F     fff (VARIETY SHOW-OTHERS)
G     ggg (DOCUMENTARY/CULTURE-NATURE/ANIMAL/ENVIRONMENT)
H     hhh (DRAMA-OVERSEAS DRAMA)
I     iii (MOVIE-FOREIGN MOVIE)
J     jjj (MUSIC-LIVE CONCERT)

⇩

WHEN THE PROGRAMS ACTUALLY WATCHED ARE BROADCASTED, THE PROGRAMS ARE DISPOSED BASED ON PRIORITY IN AN ORDER OF THE CUSTOMARY CHANNELS

THIS ORDER
C     ccc (NEWS/NEWS REPORT-REGULAR/GENERAL)
D     ddd (VARIETY SHOW-TALK VARIETY SHOW)
B     bbb (NEWS/SPECIAL ARTICLE/DOCUMENTARY)
E     eee (VARIETY SHOW-COMEDY)
F     fff (VARIETY SHOW-OTHERS)
A     aaa (SPORTS-MARINE WINTER SPORTS)
G     ggg (DOCUMENTARY/CULTURE-NATURE/ANIMAL/ENVIRONMENT)
H     hhh (DRAMA-OVERSEAS DRAMA)
I     iii (MOVIE-FOREIGN MOVIE)
J     jjj (MUSIC-LIVE CONCERT)

NEXT, DISPOSED IN AN ORDER OF CUSTOMARY GENRES

THE REST IS DISPOSED IN AN OVERALL CHANNEL VIEWING ORDER

FEELING OF USER
WATCH ccc OR ddd AS USUAL.

FIG.7

WHEN THIS PROGRAM COMES ...
A aaa (SPORTS-MARINE WINTER SPORTS)
B bbb (NEWS/SPECIAL ARTICLE/DOCUMENTARY)
C xxx (DRAMA-DOMESTIC DRAMA)   ← J3
D ddd (VARIETY SHOW-TALK VARIETY SHOW)
E eee (VARIETY SHOW-COMEDY)
F fff (VARIETY SHOW-OTHERS)
G ggg (DOCUMENTARY/CULTURE-NATURE/ANIMAL/ENVIRONMENT)
H hhh (DRAMA-OVERSEAS DRAMA)
I iii (MOVIE-FOREIGN MOVIE)
J jjj (MUSIC-LIVE CONCERT)

⇩

THIS ORDER
D ddd (VARIETY SHOW-TALK VARIETY SHOW)
B bbb (NEWS/SPECIAL ARTICLE/DOCUMENTARY)
E eee (VARIETY SHOW-COMEDY)
F fff (VARIETY SHOW-OTHERS)
C xxx (DRAMA-DOMESTIC DRAMA)
G ggg (DOCUMENTARY/CULTURE-NATURE/ANIMAL/ENVIRONMENT)
H hhh (DRAMA-OVERSEAS DRAMA)
I iii (MOVIE-FOREIGN MOVIE)
A aaa (SPORTS-MARINE WINTER SPORTS)
J jjj (MUSIC-LIVE CONCERT)

> WHEN THE PROGRAMS ACTUALLY WATCHED ARE BROADCASTED, THE PROGRAMS ARE DISPOSED BASED ON PRIORITY IN AN ORDER OF THE CUSTOMARY CHANNELS

> NEXT, DISPOSED IN AN ORDER OF CUSTOMARY GENRES

> THE REST IS DISPOSED IN AN OVERALL CHANNEL VIEWING ORDER

*C IS A CH THAT ALWAYS WATCHED, BUT SINCE IT IS NOT A USUAL PROGRAM, THE PRIORITY IS LOWERED

FEELING OF USER
LET'S WATCH USUAL ddd.
THE USUAL ccc IS NOT ON AIR. LET'S WATCH THIS bbb INSTEAD.

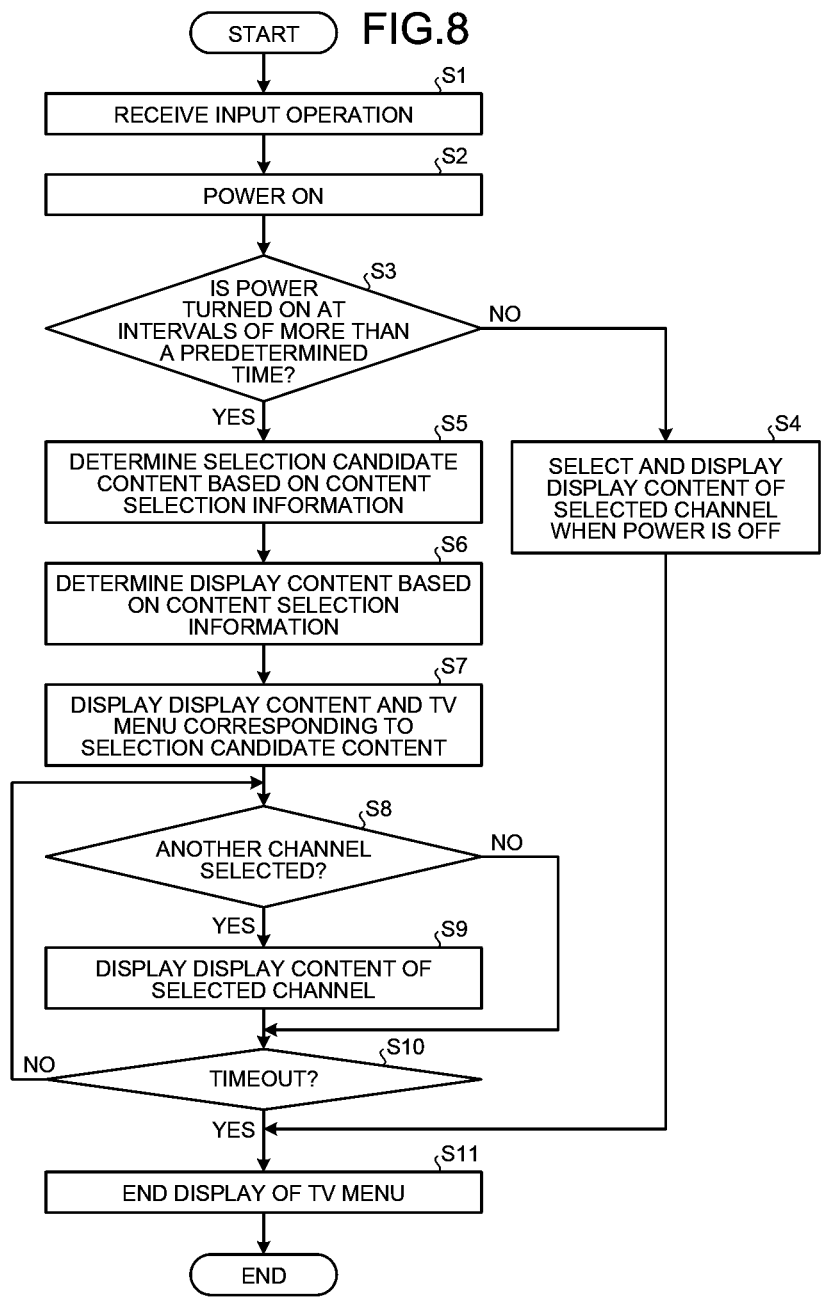

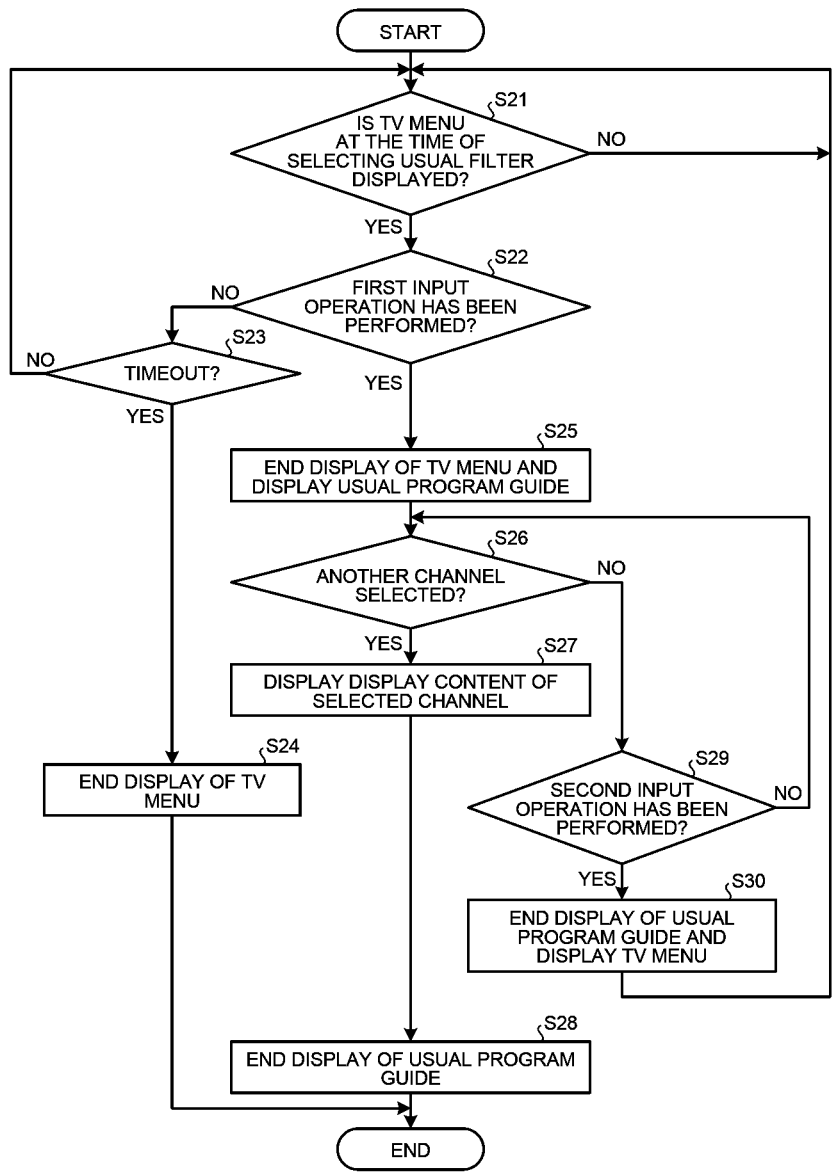

FIG.13

FIG. 14A | VIEWABLE CH (CH USED or FREE PROGRAM) | UNVIEWABLE CH (CH THAT HAS NOT BEEN USED and PAY PROGRAM)

FIG. 14B | VIEWABLE CH FAVORITE SMALL GENRE | VIEWABLE CH OTHERS | UNVIEWABLE CH (CH THAT HAS NOT BEEN USED and PAY PROGRAM)

FIG. 14C | VIEWABLE CH FAVORITE TEAM | VIEWABLE CH FAVORITE SMALL GENRE | VIEWABLE CH OTHERS | UNVIEWABLE CH (HAS NOT BEEN USED and PAY PROGRAM)

FIG. 14D | VIEWABLE CH FAVORITE TEAM | VIEWABLE CH OTHERS | UNVIEWABLE CH (HAS NOT BEEN USED and PAY PROGRAM)

FIG.17

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2021/030145 filed on Aug. 18, 2021, which claims priority benefit of Japanese Patent Application No. JP 2020-145069 filed in the Japan Patent Office on Aug. 28, 2020. Each of the above-referenced applications is hereby incorporated herein by reference in its entirety.

FIELD

The present disclosure relates to an information processing device and an information processing method.

BACKGROUND

Currently, there are various types of broadcasting such as terrestrial broadcasting, satellite broadcasting, cable television broadcasting, and Internet broadcasting, and the number of channels is as large as several hundred channels. In an area where the large number of channels can be viewed, that is, a multi-channel area, in order to select a content that the user wants to view on a television or the like, for example, the user performs an operation of frequently switching channels, an operation of selecting a channel that the user wants to view from an electronic program guide (EPG), or the like.

However, the operation as described above is likely to be a complicated operation, and it is difficult for the user to select a channel to be viewed in a multi-channel area. In order to facilitate this channel selection, a technique has been proposed in which, when a television is powered on, a channel having the highest viewing frequency is selected among channels selected in the past time zone corresponding to the time when the television is powered on (see, for example, Patent Literature 1).

CITATION LIST

Patent Literature

Patent Literature 1: JP 2010-263510 A

SUMMARY

Technical Problem

However, in the above-described conventional technology, a channel desired to be viewed by the user, that is, a content desired by the user is not necessarily displayed. In a case where the content that the user desires to view is not displayed, a complicated operation is required to select the content that the user desires to view, and thus, it is difficult to easily view the content that the user desires.

Therefore, the present disclosure proposes an information processing device and an information processing method capable of easily viewing a content desired by a user.

Solution to Problem

According to the present, an information processing device including a control unit configured to perform a process of acquiring content selection information about a user, a process of determining a display content and content selection candidate information based on the content selection information, and a process of outputting the display content and a first display image corresponding to the selection candidate information is provided.

According to the present, an information processing method executed by a computer, the method including a process of acquiring content selection information about a user, a process of determining a display content and content selection candidate information based on the content selection information, and a process of outputting the display content and a first display image corresponding to the selection candidate information is provided.

BRIEF DESCRIPTION OF DRAWINGS

FIG. 5 is a diagram for describing a second display screen (usual program guide) at the time of selecting a usual filter according to the first embodiment.

FIG. 6 is a first diagram for describing priority at the time of selecting a usual filter according to the first embodiment.

FIG. 7 is a second diagram for describing priority at the time of selecting a usual filter according to the first embodiment.

FIG. 8 is a flowchart illustrating a flow of a first display process at the time of selecting a usual filter according to the first embodiment.

FIG. 9 is a flowchart illustrating a flow of a second display process at the time of selecting a usual filter according to the first embodiment.

FIG. 13 is a first diagram for describing a second display screen (preference program guide) at the time of selecting a genre filter according to the second embodiment.

FIGS. 14A, 14B, 14C, and 14D are first diagrams for describing priority at the time of selecting a genre filter according to the second embodiment.

FIG. 17 is a second diagram for describing a second display screen (preference program guide) at the time of selecting a genre filter according to the second embodiment.

DESCRIPTION OF EMBODIMENTS

Hereinafter, the embodiments of the present disclosure will be described in detail with reference to the drawings. The drawings illustrate only an example. In the following embodiments, the same parts are denoted by the same reference signs, and a duplicate description will be omitted.

The description will be given in the following order.
1. First Embodiment
1-1. Basic configuration example
1-2. Functional configuration example
1-3. Display screen at the time of selecting usual filter (TV menu, usual program guide)
1-4. Priority at the time of selecting usual filter
1-5. First display process (TV menu) at the time of selecting usual filter
1-6. Second display process at the time of selecting usual filter (usual program guide)
1-7. Third display process (voice input operation) at the time of selecting usual filter
1-8. Usual filter setting screen
1-9. Summary of first embodiment
2. Second Embodiment
2-1. Display screen at the time of selecting genre filter (TV menu and preference program guide)
2-2. Priority at the time of selecting genre filter
2-3. First display process (TV menu) at the time of selecting genre filter
2-4. Second display process (preference program guide) at the time of selecting genre filter
2-5. Recommendation display of preference program guide
2-6. Summary of second embodiment
3. Other embodiments
3-1. Various settings by control panel
3-2. Selectable display of usual filter
3-3. Customization of usual program guide
3-4. Highlight display of TV menu
4. supplementary note

1. First Embodiment

1-1. Basic Configuration Example

Figure 1:
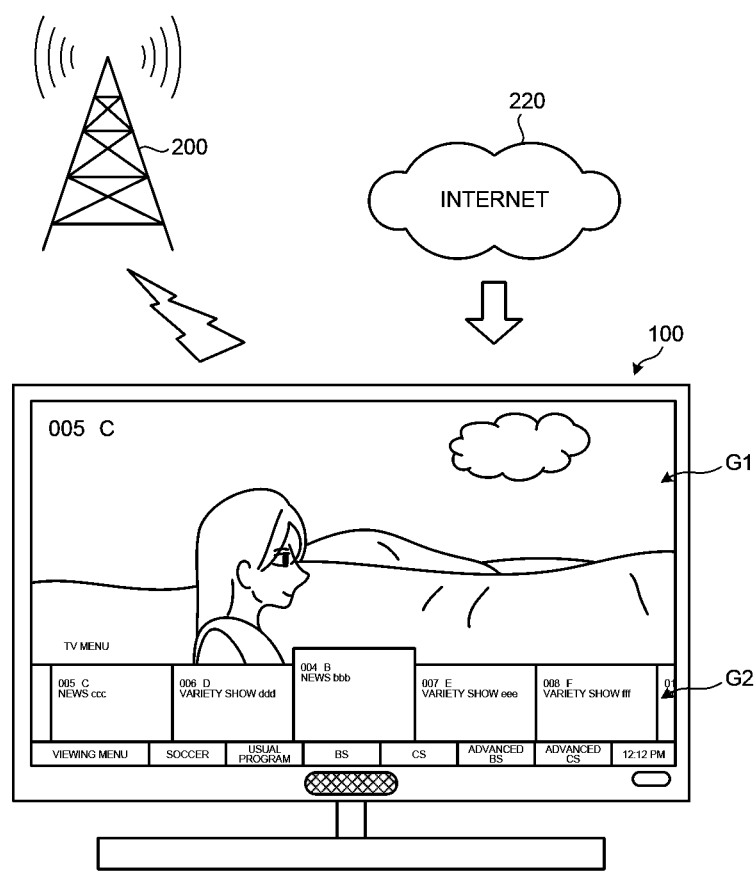
FIG. 1 is a diagram for describing an overview of an information processing device according to the first embodiment.
Figure 2:
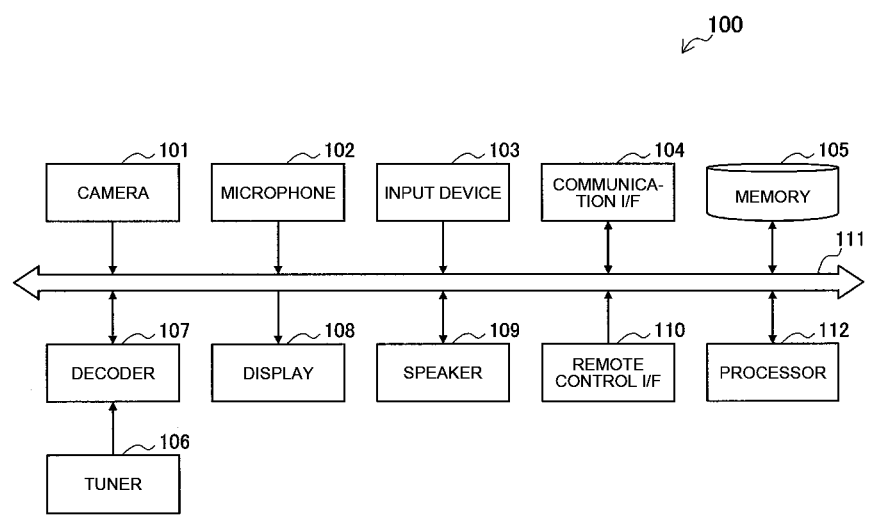
FIG. 2 is a block diagram illustrating a hardware configuration of the information processing device according to the first embodiment.

A basic configuration of an information processing device according to the first embodiment will be described with reference to FIGS. 1 and 2. FIG. 1 is a diagram for describing an overview of the information processing device according to the first embodiment. FIG. 2 is a block diagram illustrating a hardware configuration of the information processing device according to the first embodiment.

As illustrated in FIG. 1, an information processing device 100 functions as a receiving device that receives broadcast signals broadcast from a broadcasting tower 200 by respective broadcasting station and content data distributed from the Internet 220 (specifically, a content distribution server communicatively connected via the Internet). The information processing device 100 is a television device including a display screen (display). On the display screen, for example, as illustrated in FIG. 1, an image G1 of the display content is displayed on the entire screen (the entire region of the screen), and a TV menu (mini program guide) G2 which is a user interface image (UI image) is displayed in the lower region of the screen.

Note that the information processing device 100 is not limited to a television device, but may be an external device (external equipment) such as a smartphone, a projector, a car navigation system, a computer, a set top box (STB), a recorder having a record and playback function, or a player having a playback function. For example, a set top box, a recorder, and a player are used by being connected to a television device.

As illustrated in FIG. 2, the information processing device 100 includes a camera 101, a microphone 102, an input device 103, a communication interface (I/F) 104, a memory 105, a tuner 106, a decoder 107, a display 108, a speaker 109, a remote control I/F 110, a bus 111, and a processor 112.

The camera 101 includes an imaging element such as a charge coupled device (CCD) or a complementary metal oxide semiconductor (CMOS), and captures an image. An image (for example, each frame constituting a moving image) captured by the camera 101 is treated as an input image for processing by the information processing device 100.

The microphone 102 collects a voice uttered by the user and generates a voice signal. The voice signal generated by the microphone 102 is treated as an input voice for voice recognition by the information processing device 100.

The input device 103 is a device used by the user to directly operate the information processing device 100. For example, the input device 103 includes buttons, switches, dials, and the like disposed in a housing of the information processing device 100. When detecting an input operation (user input) of the user, the input device 103 generates an input signal corresponding to the detected input operation by the user.

The communication I/F 104 mediates communication between the information processing device 100 and another device (external device). For example, the communication I/F 104 supports any wireless communication protocol or wired communication protocol, and establishes a communication connection with another device. Furthermore, the communication I/F 104 receives a content signal from an external device (for example, an Internet distribution server), and extracts content data from the content signal.

Note that the communication I/F 104 includes a communication device or the like for connecting it to a network. The network connected to the communication I/F 104 is a network connected in a wired or wireless manner, and is, for example, the Internet, a home local area network (LAN), or the like.

For example, the communication I/F 104 is a communication card or the like for wired or wireless LAN, Bluetooth (registered trademark), Wi-Fi (registered trademark), or wireless USB (WUSB). Furthermore, the communication I/F 104 may be a connection port such as a Universal Serial Bus (USB) terminal, an optical audio terminal, or a high-definition multimedia interface (HDMI) (registered trademark) terminal. Furthermore, the communication I/F 104 may be, for example, a router for optical communication, a router for asymmetric digital subscriber line (ADSL), a modem for various communications, or the like. The communication I/F 104 transmits and receives signals and the like to and from the Internet and other communication devices using a predetermined protocol such as TCP/IP.

The memory 105 includes a storage medium such as a semiconductor memory or a hard disk, and stores a program and data for processing by the information processing device 100, and content data. The data stored in the memory 105 includes, for example, data necessary for various processes described later. Note that some or all of the programs and data may be acquired from an external data source (for example, a data server, a network storage, an external memory, or the like) without being stored in the memory 105.

The tuner 106 extracts and demodulates a content signal of a desired channel from a broadcast signal received via an antenna (not illustrated). Then, the tuner 106 outputs the demodulated content signal to the decoder 107.

The decoder 107 decodes content data from a content signal input from the tuner 106. Furthermore, the decoder 107 may decode content data from a content signal received via the communication I/F 104. A content image is generated based on the content data decoded by the decoder 107.

The display 108 includes a screen (display screen) including a liquid crystal display (LCD), an organic light-emitting diode (OLED), a cathode ray tube (CRT), or the like. The display 108 displays an image generated by the information processing device 100 on a screen.

The speaker 109 includes circuit elements such as a diaphragm and an amplifier to output a voice based on an output voice signal generated by the information processing device 100. The volume of the speaker 109 can be changed according to an input operation by the user to the input device 103 or an input operation by the user to a local terminal such as a remote controller.

The remote control I/F 110 receives a remote control signal (for example, infrared signals or other wireless signals) transmitted from a local terminal such as a remote controller used by a user. When detecting the remote control signal, the remote control I/F 110 generates an input signal corresponding to the detected remote control signal. In addition, examples of the local terminal may include a smartphone, a tablet terminal, or a personal computer (PC) in addition to the remote controller.

The bus 111 mutually connects the camera 101, the microphone 102, the input device 103, the communication I/F 104, the memory 105, the tuner 106, the decoder 107, the display 108, the speaker 109, the remote control I/F 110, and the processor 112.

The processor 112 is, for example, a central processing unit (CPU), a digital signal processor (DSP), or the like. The processor 112 realizes various functions of the information processing device 100 to be described later by executing a program stored in the memory 105 or another storage medium.

The basic configuration of the information processing device 100 according to the first embodiment is described above. However, the hardware configuration illustrated in FIG. 2 is an example, and the present invention is not limited to this. For example, the information processing device 100 may not include the camera 101, and the microphone 102 may be provided in an external device (for example, a voice terminal such as a smart speaker or a mobile terminal such as a smartphone) connected to the information processing device 100 or an input terminal such as a remote controller.

Note that the information processing device 100 is a device capable of receiving video and voice data from an external device such as a recorder, a game machine, a PC, a digital camera, or a smartphone connected via the communication I/F 104, and outputting and playing back the data from the display 108 or the speaker 109. Furthermore, a plurality of external devices can be connected to the information processing device 100 (alternatively, a plurality of external devices can be connected to the information processing device 100 via a distributor). In a situation where one or more external devices are connected to the information processing device 100, the user can select or switch the external device by the user's input operation.

1-2. Functional Configuration Example

Figure 3:
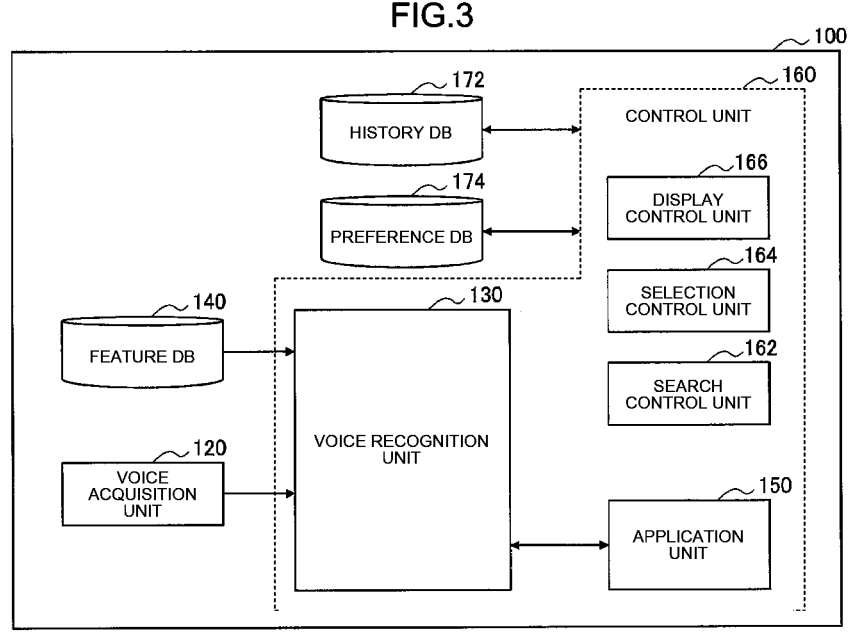
FIG. 3 is a block diagram illustrating a configuration of a logical function of the information processing device according to the first embodiment.

Next, a functional configuration of the information processing device according to the first embodiment will be described with reference to FIG. 3. FIG. 3 is a block diagram illustrating a configuration of a logical function of the information processing device according to the first embodiment.

As illustrated in FIG. 3, the information processing device 100 includes a voice acquisition unit 120, a feature database (DB) 140, a control unit 160, a history DB 172, and a preference DB 174. The control unit 160 includes a voice recognition unit 130, an application unit 150, a search control unit 162, a selection control unit 164, and a display control unit 166.

Note that some of the functional blocks illustrated in FIG. 3 may be realized in an external device (for example, a device in a cloud computing environment) of the information processing device 100. Furthermore, for example, the control unit 160 may cause an external control function to execute the processing (control process) described below instead of executing the processing by itself.

The voice acquisition unit 120 acquires a voice signal generated by the microphone 102 as an input voice. Then, the voice acquisition unit 120 outputs the acquired input voice to the voice recognition unit 130.

The voice recognition unit 130 recognizes the voice of the user based on the input voice input from the voice acquisition unit 120. For example, the voice recognition unit 130 converts the input voice into a text indicating the content thereof to output the text to the control unit 160 or the application unit 150. Note that the start process of voice reception and voice recognition may be automatically started, or may be started using a button or an icon disposed in a local terminal such as a remote controller.

For example, the voice recognition unit 130 may identify the speaker (user) by using the voice feature data stored in the feature DB 140 in recognition of the input voice input from the voice acquisition unit 120. The voice recognition unit 130 outputs the identification result of the speaker to the control unit 160 and the application unit 150.

Note that, in the first embodiment, the information processing device 100 performs a voice recognition process, but the present invention is not limited to this. For example, the voice recognition process may be performed by an external device connected to the information processing device 100. Examples of the external device include a local terminal such as a smart speaker, a smartphone, a tablet terminal, or a PC, a server on the Internet, or the like.

The feature DB 140 stores in advance voice feature data used for voice recognition by the voice recognition unit 130. The voice feature data includes, for example, a voice feature amount indicating a feature of utterance for each user.

Note that the feature DB 140 may store image feature data used for image recognition. The image feature data includes, for example, a known image feature amount of a predetermined portion such as a hand or a face of the user. The image feature data may include face image data for each user. Furthermore, the feature DB 140 may be constructed in the information processing device 100 or may be constructed on an external device such as an external server.

The history DB 172 stores history information about a viewing history and a reservation history of the contents (broadcast program, recorded program, Internet distributed program, application, and the like). The viewing history includes a viewing time and a viewing time duration of the content, a usage count and a usage time (application selection information) of the application, user information, a search history by the user, a selection history of the search result, and the like. The reservation history includes a content reservation time, a content reserved viewing time, and the like. The history information is generated for each user (for example, a father, a mother, a son, and the like), and is stored in the history DB 172 in association with each user. Such history information is included in content selection information (content selection record information) used for search for and determination of the content viewed by the user.

Note that the history information is generated for each user, but the present invention is not limited to this, and the information may not be generated for each user. Furthermore, the history information is obtained by detecting the viewing history or the reservation history of the user by the information processing device 100, but the present invention is not limited to this. For example, the history information may be acquired from various external devices and set in the history DB 172. Furthermore, the history DB 172 may be constructed in the information processing device 100 or may be constructed on an external device such as an external server.

The preference DB 174 stores preference information about the user. The preference information includes, for example, information about a sport, a sports team, an entertainer, a singer, a writer, an original author of a drama, a character, and the like that the user likes. As in the history information, the preference information is generated for each user (for example, a father, a mother, a son, and the like) and stored in the history DB 172 in association with each user. Such history information is included in content selection information used for search for and determination of content viewed by the user.

Note that the preference information is generated for each user, but the present invention is not limited to this, and may not be generated for each user. Furthermore, the preference information is obtained by detecting the user's preference (for example, which content the user has frequently viewed, and the like) based on the history information or the like, but the present invention is not limited to this. For example, the preference information may be set in the preference DB 174 in advance by a user's input operation or the like. Furthermore, the preference DB 174 may be constructed in the information processing device 100 or may be constructed on an external device such as an external server.

The application unit 150 executes various application functions of the information processing device 100. For example, a program playback function, an electronic program guide display function, a recording setting function, an external input switching function, a photograph regeneration function, a moving image playback function, a music playback function and an Internet browsing function, an image recognition function, and the like are executed by the application unit 150. The application unit 150 outputs an application image (including a content image) and a voice generated through the application function to the control unit 160. Note that at least part of the application function cooperates with the voice recognition unit 130 and receives a voice input from the user.

For example, the program playback function performs setting and change of a channel, volume, and the like of a television program or an Internet distributed program, playback of a recorded program, and the like in accordance with an input operation by the user of the input device 103 or the local terminal, and a voice input operation (hereinafter, it is simply referred to as a user's input operation, but when it is necessary to distinguish, it is referred to as a voice input operation) by the user recognized by the voice recognition unit 130. The electronic program guide display function changes display, a channel, a time zone, and the like of the electronic program guide according to an input operation by the user.

Furthermore, the recording setting function sets the recording date and time and the channel according to the input operation by the user. Data of the recorded program is stored in the memory 105 of the information processing device 100. The external input switching function switches the external input according to the input operation by the user. The photograph regeneration function regenerates a picture captured on the designated date input according to the input operation by the user. The Internet browsing function executes the Internet search using the keyword input according to the input operation by the user.

Furthermore, the image recognition function recognizes an input image captured by the camera 101 and input to the application unit 150. In the image recognition, for example, an image feature amount extracted from the input image is collated with an image feature amount stored in advance by the feature DB 140 of a predetermined portion (for example, a face, a hand, or the like) of the user's body, thereby recognizing the predetermined portion. For example, the image recognition function identifies the user by face recognition, receives gesture input of the user, and recognizes a predetermined gesture from movement of a hand.

Here, in a case where the history information and the preference information described above are stored for each of a plurality of users such as family members, it is necessary to identify the user in order to read out the history information and the preference information suitable for the user. Therefore, a user identifying function (profile function) for identifying a user is executed by the application unit 150. The profile function identifies the user according to, for example, an input operation by the user or biometric information (for example, voice, face, or the like) of a human. As an example, one GUI is selected by a user's input operation on a graphic user interface (GUI) displayed for each user, and a user corresponding to the selected GUI is identified. Furthermore, for example, as described above, voice recognition by the voice recognition unit 130 or image recognition by the image recognition function is executed, and the user is identified.

For example, in a case where a father says "show me a usual program", the user is identified as a father by voice recognition (for example, voiceprint matching) or image recognition (for example, face matching), and history information and preference information about the identified father are read from the history DB 172 and the preference DB 174. Furthermore, it is also possible to identify the user with a keyword by voice. For example, in a case where a father says "show me the father's usual program", the father is identified by a keyword of "father", and history information and preference information about the identified father are read from the history DB 172 and the preference DB 174.

The search control unit 162 performs a process of searching for the content desired by the user based on the content selection information including the history information and the preference information according to the input operation by the user. For example, the search control unit 162 searches for a channel (a channel number or a channel name) or a program name currently being broadcast or distributed via the Internet, a channel or a program name of a recorded program, or the like based on content selection information including history information and preference information according to an input operation by the user. Then, the search control unit 162 determines the content obtained by the search as the selection candidate content, and generates content selection candidate information about the determined selection candidate content. Note that the recorded program may be stored in the memory 105 or may be stored in an external device such as a recorder connected via the communication I/F 104.

The selection control unit 164 performs a process of selecting one content (display content) to be displayed on the entire screen of the display 108 from the selection candidate contents (content selection candidate information) which is the search result by the search control unit 162. In a case where the number of the selection candidate contents is one, the selection control unit 164 may select the one content. However, in a case where the number of the selection candidate contents is plural, the selection control unit selects one display content according to a predetermined criterion in order to select the content that is highly likely to be requested by the user.

The predetermined criterion is, for example, priority based on content selection information including history information and preference information. The selection control unit 164 determines the priority of each of the plurality of selection candidate contents according to one or both of the history information and the preference information of the content selection information. Note that the user is identified by the user's input operation, voice recognition, image recognition (face recognition), or the like as described above, and the history information and the preference information corresponding to the identified user are obtained from the history DB 172 and the preference DB 174.

For example, the selection control unit 164 increases the priority of a channel, a program, a genre, or the like frequently viewed by the viewing user or increases the priority of a channel, a program, a genre, or the like frequently recorded by the viewing user based on one or both of history information and preference information about the identified user (viewing user). The genre is a classification according to content contents, and examples of the genre include news, variety show, music, drama, movie, and documentary. As an example, the selection control unit 164 increases the priority of the channel/program/genre for each time zone or each day of the week in descending order of the viewing time or the recording time in the latest predetermined period (for example, one month). The selection control unit 164 determines the program with the highest priority as the display content.

Note that the selection control unit 164 may calculate the priority according to a combination of users or the number of users. For example, based on the viewing history, it is possible to identify a channel/program/genre that is frequently viewed in a case where the family is together, a channel/program/genre that is frequently viewed in a case where only the parents are together, a channel/program/genre that is frequently viewed in a case where only the children are together, or the like, and to appropriately calculate the priority in each case. Furthermore, even in a case where the identification information about the user cannot be acquired, for example, the selection control unit 164 may increase the priority of a channel/program/genre that is frequently viewed, a program/genre that is frequently recorded, or the like, in the current time zone. Furthermore, the selection control unit 164 may increase the priority of, for example, the most recently selected channel, program, or genre based on only the viewing history regardless of the person or time. In addition, in a case where a recorded program is included in selection candidate content that is a search result, the selection control unit 164 may increase the priority of an unviewed program or decrease the priority of a viewed program.

The display control unit 166 controls display of an image via the display 108. For example, the display control unit 166 generates, according to a search result by the search control unit 162 and a selection result by the selection control unit 164, an image according to the search result and the selection result to output and displays the image on the display 108. In addition, the display control unit 166 causes the display 108 to display the application image input from the application unit 150.

For example, the display control unit 166 performs a process of displaying the image G1 of the selected display content on the entire screen of the display 108 according to the selection result by the selection control unit 164 (see FIG. 1). In addition, the display control unit 166 performs a process of generating the TV menu G2 corresponding to the selection candidate content and displaying the TV menu G2 on the screen of the display 108 according to the selection candidate content (content selection candidate information) which is the search result obtained by the search control unit 162 (see FIG. 1). At this time, the TV menu G2 is superimposed on the image G1 of the display content displayed on the entire screen of the display 108, and is displayed in a predetermined region (for example, the lower region of the screen) of part of the screen of the display 108 (see FIG. 1). The TV menu G2 is automatically deleted, for example, in a case where there is no input operation by the user for a certain period of time after display. The display time of the TV menu G2 is set in advance, but may be changed based on user setting information, preference information, or the like.

Note that, in the TV menu G2 described above, the display content varies depending on filter selection according to the input operation by the user, but a display screen at the time of selecting a usual filter, a display image at the time of selecting a genre filter, and the like will be described later in detail. Note that the filter is a filter for selecting a channel or a program that the user wants to view, and various filters exist in the TV menu G2.

The control unit 160 controls (processes) the entire information processing device 100 in addition to the search control unit 162, the selection control unit 164, and the display control unit 166. For example, the control unit 160 performs a process of turning on the power of the entire information processing device 100 including the display 108 according to the input operation by the user (return from the standby state). In addition, the control unit 160 performs a process of activating the program playback application by the application unit 150 and displaying the image G1 of the display content selected by the selection control unit 164 on the display 108. At this time, the control unit 160 also performs a process of superimposing and displaying the TV menu G2 on the image G1 of the display content.

The functional configuration of the information processing device 100 according to the first embodiment has been specifically described above. Note that the functional configuration of the information processing device 100 illustrated in FIG. 3 is an example, and the present invention is not limited to this. For example, at least part of the functional configuration of the information processing device 100 illustrated in FIG. 3 may be in an external device (for example, a local terminal or a server on a cloud) communicatively connected to the information processing device 100.

Figure 4:
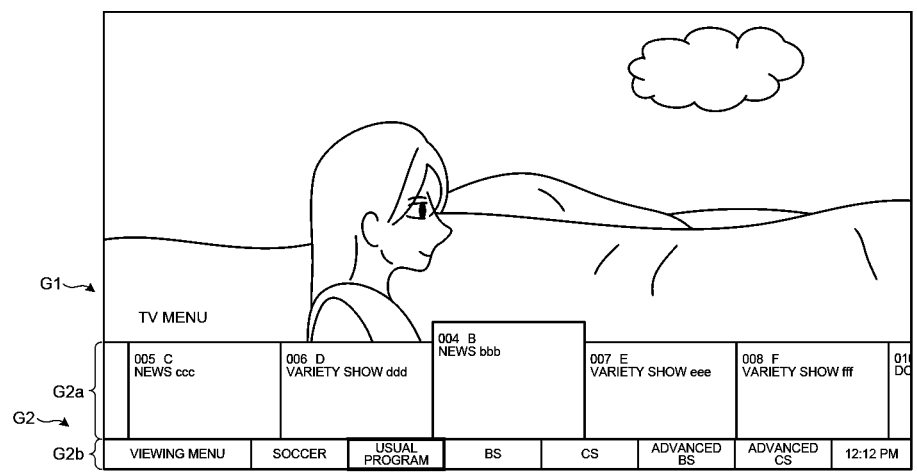
FIG. 4 is a diagram for describing a first display screen at the time of selecting a usual filter according to the first embodiment.
Figure 5:
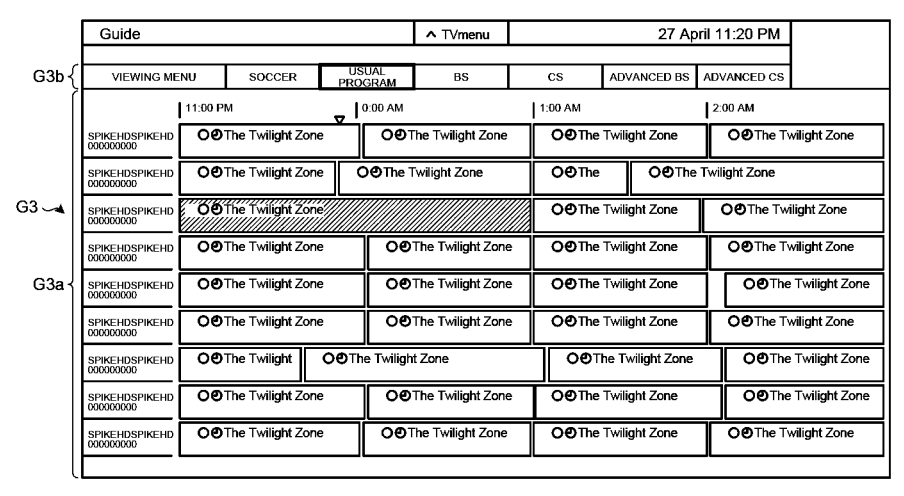

1-3. Display Screen at the Time of Selecting Usual Filter: TV Menu, Usual Program Guide Next, the first display screen (TV menu: first display image) at the time of selecting a usual filter according to the first embodiment will be described with reference to FIG. 4, and the second display screen (usual program guide: third display image) at the time of selecting a usual filter according to the first embodiment will be described with reference to FIG. 5. FIG. 4 is a diagram for describing the first display screen at the time of selecting a usual filter according to the first embodiment. FIG. 5 is a diagram for describing the second display screen at the time of selecting a usual filter according to the first embodiment.

As illustrated in FIG. 4, for example, the image G1 of the display content is displayed on the entire screen of the display 108, and the TV menu G2 is displayed in the lower region of the screen of the display 108. The TV menu G2 is a user interface image (UI image) having an image G2*a* indicating the first selection column and an image G2*b* indicating the second selection column. The image G2*a* indicating the first selection column is an image in which item images corresponding to selection candidate contents of respective channels are disposed and indicated in a selectable manner in the horizontal direction of the screen of the display 108. In addition, the image G2*b* indicating the second selection column is an image in which filter names (category information) of respective types are disposed and indicated in a selectable manner in the horizontal direction of the screen of the display 108. In FIG. 4, for example, "soccer", "usual program", "BS", "CS", "advanced BS", "advanced CS", and the like are illustrated as filter names.

Note that examples of the filter include filters of a terrestrial wave, a BS, and the like, filters (genre filters) of sports, a movie, and the like, filters of sports types such as soccer, baseball, and the like, but the present invention is not limited to this, and for example, may include categories such as a team filter, an actor filter, an original author filter, and the like. Furthermore, there may be a category of an external device filter such as an STB or a recorder, an external input filter such as HDMI (registered trademark), or an application filter such as a video on demand (VOD) application or a streaming application.

Here, for example, in the TV menu G2 described above, when any of the item images is selected by the user's input operation, the image G1 of the display content is switched to the content image of the channel based on the selected item image. In addition, when any of the filters is selected, the image G1 of the display content may be switched to a content image corresponding to the selected filter, and the TV menu G2 corresponding to the selected filter may be displayed.

For example, when a usual filter (filter name in FIG. 4: "usual program") is selected, the display content and the selection candidate content (content selection candidate information) are determined based on the history information included in the content selection information. Then, as illustrated in FIG. 4, the image G1 of the determined display content is displayed on the entire screen of the display 108, and further, the TV menu G2 having item images corresponding to the determined selection candidate content and respective filter names are displayed in the lower region of the screen of the display 108. The respective item images are disposed in the screen of the display 108 in the horizontal direction in order of priority in the TV menu G2. For example, the respective item images are disposed in descending order of priority from the left. Further, when the usual filter is selected, only the item image in the TV menu G2 may be changed, and the image G1 of the display content may not be changed. Furthermore, for example, in a state where the selection frame or the cursor is placed on each filter of the TV menu G2, only the item images in the TV menu G2 are changed, and when the filter is selected by pressing a determination button provided in the remote controller, the display content may be changed to a display content corresponding to the usual filter or a display content of the content source corresponding to the filter.

Note that the respective item images may be disposed in order of priority in the horizontal direction of the screen in the upper region of the screen of the display 108, or may be disposed in order of priority in the vertical direction of the screen in the left region or the right region of the screen of the display 108. Alternatively, the respective item images may be randomly displayed on the entire screen of the display 108 so that the priority can be recognized, and a display style thereof is not particularly limited.

In addition, in a state where a usual filter (filter name in FIG. 4: "usual program") is selected, for example, when a predetermined input operation (as an example, a pressing operation of a down button provided in the remote controller) is received, a usual program guide G3 is displayed on the entire screen of the display 108 as illustrated in FIG. 5. the usual program guide G3 is a user interface image having a program guide image G3*a* and an image G3*b* indicating the selection column. Program guide image G3*a* is an image in which item images corresponding to the selection candidate contents determined as described above are disposed and indicated for respective time zones. The respective item images are disposed in the screen of the display 108 in the longitudinal direction in order of priority in the program guide image G3*a*. For example, the respective item images are disposed in descending order of priority. In addition, the image G3*b* indicating the selection column is an image in which filter names (category information) of respective types are disposed and indicated in a selectable manner in the horizontal direction of the screen of the display 108. The image G3*b* indicating the selection column is displayed in the upper region of the screen of the display 108. In FIG. 5, as in FIG. 4, for example, "soccer", "usual program", "BS", "CS", "advanced BS", "advanced CS", and the like are illustrated as filter names. Here, an image indicating an operation corresponding to the process of switching between the TV menu G2 and the usual program guide G3 may be displayed. Specifically, for example, it is conceivable to display an image indicating a remote controller operation (for example, a down button pressing operation of the remote controller) or a voice utterance (for example, "open a program guide") for switching to a screen including the usual program guide G3 on a screen including the TV menu G2 illustrated in FIG. 4.

Here, the TV menu G2 and the usual program guide G3 has the usual filter (filter name in FIG. 4: "usual program")

at positions corresponding to each other. The corresponding positions in the TV menu G2 and the usual program guide G3 represent, for example, the same positional relationship in the column direction in which the filter names are disposed. In addition, the corresponding positions represent, for example, a positional relationship in which in a case where the TV menu G2 is displayed in the lower region of the screen of the display 108, the image G3b of the usual program guide G3 is displayed in the upper region (the display region opposite to the display region of the TV menu G2 on the screen of the display 108) of the screen of the display 108. The filters other than the usual filter (for example, "soccer", "BS", and the like of the images Gb2 and G3b) may be displayed at corresponding positions, or all filters may be displayed at corresponding positions in the TV menu G2 and the usual program guide G3. In addition, at the time of switching processing between the TV menu G2 and the usual program guide G3, the image G2b indicating the second selection column of the TV menu G2 and the image G3b indicating the selection column of the usual program guide G3 may be seamlessly switched. For example, image display may be performed such that the image G2b indicating the second selection column of the TV menu G2 moves to a position corresponding to the image G3b indicating the selection column of the usual program guide G3.

Note that, in the TV menu G2 or the usual program guide G3, the item image may include the recorded program and the like in addition to the current broadcast program of the channel obtained by the search, and the current broadcast program and the recorded program may be simultaneously displayed. That is, the search control unit 162 also outputs a search result including the recorded program of the searched channel. Here, it is also possible that only the recorded program is included and the program currently being broadcast is not included as the search target. In addition, the recorded program to be searched for may be limited to an unviewed program.

In addition, in the TV menu G2 or the usual program guide G3, the name of the channel may be displayed in a predetermined display mode in the item image, and in addition, the title of the broadcast program currently broadcasted in the channel, the channel number, the mark of the channel or the broadcast station, and the like may be displayed, that is, information related to the channel, the program, and the like may be displayed. Furthermore, in order to clearly indicate the item image indicating the currently selected channel, the selected item image may be highlight-displayed so as to be different from other item images, or an icon such as "select" may be added to the selected item image. Furthermore, in the respective item images, information indicating a viewing state of each content, for example, a bar indicating a previous playback position (viewed position) may be displayed, and a "NEW" mark or the like may be displayed for an unviewed content.

In addition, in the TV menu G2 or the usual program guide G3, in the item image, channel information, a content name (a program title or the like), a content outline, or information indicating whether the content is a currently broadcast program, whether it is a recorded program, whether it is a VOD item, whether it is an Internet distributed program, or the like may be displayed, or a still image or a moving image thumbnail may be displayed. The information about the channel and the content, the still image and the moving image thumbnail may be acquired from a distribution source of each content, or may be acquired from a different source such as a program information transmission server. Furthermore, the moving image thumbnail of the content displayed in the item image may be acquired from a moving image distribution server, a memory, or the like and played back before the user selects the content. For example, the moving image thumbnail of the broadcast program is acquired from the VOD server, or the moving image in which the broadcast program is recorded is played back in the item image as the moving image thumbnail of the broadcast program. In the still image and the moving image thumbnail, an early stage portion of the content may be used, an any position in the content may be used, or a moving image dedicated to the thumbnail may be used. As described above, various types of information such as a still image and a moving image may be acquired from various external devices such as a server and a recorder.

1-4. Priority at the Time of Selecting Usual Filter

Next, the priority at the time of selecting a usual filter based on the content selection information (history information) according to the first embodiment will be described with reference to FIGS. 6 and 7. FIG. 6 is a first diagram for describing priority at the time of selecting a usual filter according to the first embodiment. FIG. 7 is a second diagram for describing priority at the time of selecting a usual filter according to the first embodiment.

As illustrated in FIG. 6 (upper stage), in history information J1 about the user in a certain time zone of a certain day of the week, the "channels being used" by the user are A to J. Further, the "channels and programs customarily watched at the time" by the user are "A" and "aaa", and "D" and "ddd". The "genre customarily watched by the user at the time" includes "news" and "variety show". Upper alphabet letters represents channel names, and lower alphabet letters represents program names. In FIG. 6, the "channels being used" and the "channels and programs customarily watched at the time" are disposed in descending order of priority from the top in FIG. 6. The "genres customarily watched at the time" are disposed in descending order of priority from the left in FIG. 6. In addition, the priority is higher in the order of the "channel being used", the "genres customarily watched at the time", and the "channels and program customarily watched at the time". The history information J1 as illustrated in FIG. 6 (upper stage) is stored in the history DB 172 for each day of the week and each time zone. Therefore, history information for each day of the week and each time zone is obtained, and history information for one week is stored in the history DB 172.

Based on such history information J1, the priority of the channel and the program (content) is determined by the selection control unit 164. For example, when information J2 related to channels and programs as illustrated in FIG. 6 (middle stage) is obtained from a program guide on the Internet, an electronic program guide from each broadcasting station, or the like, the channels and programs are sorted in order of priority as illustrated in FIG. 6 (lower stage) based on the history information J1. For example, the channels and programs are sorted in descending order of priority from the top in FIG. 6. Here, if the channel name is "C" and the program name is "ccc", it is the "channel and program customarily watched at the time", and thus the priority is increased.

On the other hand, when information J3 related to channels and programs as illustrated in FIG. 7 (upper stage) is obtained from a program guide on the Internet, an electronic program guide from each broadcasting station, or the like, the channels and programs are sorted in order of priority as illustrated in FIG. 7 (lower stage) based on the history information J1. For example, the channels and programs are sorted in descending order of priority from the top in FIG. 7. Here, if the channel name is "C" and the program name is "xxx", although it is the channel "C" that is customarily watched, the program name is different, so that it is not the "channel and program that are customarily watched at the time", and thus the priority is lowered.

As described above, since matching of both the channel and the program is confirmed in determination of the priority at the time of selecting a usual filter, it is possible to suppress an offer of a program that the user is not interested in, that is, the user does not want. That is, in a case where matching of only channels is confirmed, even when the program is changed to a program not desired by the user, a program not desired by the user may be provided to the user. However, as described above, by confirming matching of both the channel and the program, in a case where the program is changed to a program not desired by the user, the program does not match even if the channel match. Therefore, it is possible to suppress an offer of the program not desired by the user to the user.

Examples of the genre of programs include news, variety show, sports, documentary, drama, movie, and music. By setting a preferred genre in advance, the user may search for a more detailed genre, for example, search for a content having a plurality of genre attributes like a documentary related to music. Furthermore, although the genre of the program is described here as an example, the genre of the content is not limited to this example, and may be, for example, moving image, music, image, application, or the like, or may be a content genre other than the moving image content such as Jazz, Rock, or Ballard.

Note that the priority of the selection candidate content may be determined based on the preference information in addition to the history information J1 of the user. Furthermore, the priority may be determined in consideration of settings (user setting information) made by the user for the channel or the content. For example, processing in which the user can designate the priority itself of the channel or the content, or the priority of the program included in the viewing schedule list, the content added to the favorite, or the program whose recording has been reserved is increased may be performed. Furthermore, the priority may be determined by combining the preference information or history information about the user with the preference information or history information about another person such as a family member or a friend of the user, or the priority may be determined only from the preference information or history information about another person such as a family member or a friend of the user.

1-5. First Display Process at the Time of Selecting Usual Filter: TV Menu

Next, the first display process at the time of selecting a usual filter according to the first embodiment will be described with reference to FIG. 8. FIG. 8 is a flowchart illustrating a flow of the first display process at the time of selecting a usual filter according to the first embodiment.

As illustrated in FIG. 8, when the control unit 160 of the information processing device 100 detects an input operation by the user for turning on the power of the information processing device 100 (step S1), the control unit 160 turns on the power of the information processing device 100 (step S2). As a result, the display 108 turns on a light.

The control unit 160 determines whether the power is turned on at intervals of more than a predetermined time (step S3). When it is determined that the power is not turned on at intervals of more than the predetermined time (NO in step S3), the display control unit 166 performs a process of displaying the display content of the channel selected when the power is turned off on the display 108 (step S4), and ends the process.

On the other hand, when the power is turned on at intervals of more than the predetermined time (YES in step S3), the search control unit 162 searches for and determines a selection candidate content from a plurality of contents corresponding to the current time zone based on the content selection information (step S5). The selection control unit 164 selects and determines one display content (content to be displayed on the entire screen of the display 108) from among the selection candidate contents obtained by the search by the search control unit 162 based on the content selection information (step S6).

The display control unit 166 performs a process (channel selection) of displaying the image G1 (video) of the display content determined by the selection control unit 164 on the display 108 and a process of generating the TV menu G2 corresponding to one or more selection candidate contents and displaying the TV menu G2 on the display 108 (step S7). For example, based on the content selection information, the selection control unit 164 increases the priority of the content that is frequently viewed in the current time zone and the day of the week, and sets the content with the highest priority as the display content. In addition, the display control unit 166 generates the TV menu G2 by disposing the item images corresponding to respective selection candidate contents in order of priority.

Next, the selection control unit 164 determines whether another channel has been selected by the user's input operation (step S8). When another channel is selected by the user's input operation (YES in step S8), the selection control unit 164 determines the selected another channel as the display channel, and the display control unit 166 performs a process of displaying the image (video) G1 of the display content of the determined display channel on the display 108 (step S9). Thereafter, when a certain period of time (for example, about several seconds to about several tens of seconds) has elapsed from the display of the TV menu G2 or the selection of another channel and a timeout occurs (YES in step S10), the display control unit 166 performs a process for ending the display of the TV menu G2 (step S11).

Note that the final channel selection result together with time information and identification information about the user is stored in the history DB 172 as a viewing history of the user, and is used when the priority is calculated by the selection control unit 164 at the time of the next channel selection. By repeating such processing, the information about the viewing history of the user is accumulated, and the selection candidate content is obtained based on the history information in which the information amount is increased. As a result, since the possibility that the selection candidate content is a content desired by the user is improved, the user can view the desired content more reliably.

According to the first display process as described above, in the determination of the content selection candidate information, the content is searched for based on the content selection information (for example, history information) of the user, and the content obtained by the search is determined as the selection candidate content. In the determination of the display content, the priority of each selection candidate content is determined based on the content selection information about the user, and the channel having the highest priority is determined as the display content. In addition, respective selection candidate contents are disposed in order of priority, the TV menu G2 including item images corresponding to respective selection candidate contents disposed in order of priority and filter names is created, and the TV menu G2 is displayed together with the image G1 of the display content.

In this way, since the content that is highly likely to be desired by the user is automatically presented to the user, the user can view the desired content without executing a complicated operation of selecting the channel. As a result, the user can easily view the desired content. In a case where the display content is not the content desired by the user, the user immediately selects the channel again. Even in this case, since the TV menu G2 corresponding to the selection candidate contents is displayed, the user can visually recognize the TV menu G2 and change the content (channel change). As a result, the user can easily select and view the desired content.

Note that the usual filter is preferentially used at the time of activation, but the present invention is not limited to this, and the usual filter may not be preferentially used, or the usual filter may be preferentially used according to user selection (user setting information). For example, the control unit 160 determines whether the usual filter of the TV menu G2 has been used a specified number of times (for example, 10 times) or more, and whether the function introduction of the usual filter has never been displayed. In a case where the usual filter of the TV menu G2 is used a specified number of times (for example, 10 times) or more, or in a case where the function introduction of the usual filter is never displayed, the control unit 160 presents, to the user, a user interface image in which it is possible to select whether to preferentially use the usual filter. Then, in a case where the user selects to preferentially use the usual filter according to the user selection in the user interface image, the control unit 160 performs a process of preferentially using the usual filter.

Furthermore, in a case where the searched contents are a plurality of contents having an order such as a series of drama or a movie series (in a case where a plurality of contents having the same title name is searched for), for example, the control unit 160 may perform a process of listing contents in ascending order of numbers (story number, series number, and the like), selecting (an example of priority) the content having the lowest number except for contents that can be determined to have been viewed or almost watched up to before the staff roll, and playing back the content on the display 108. By including not only the unviewed content but also the content of which the viewing is interrupted in the middle as the contents to be selected, it is possible to play back the content from the beginning or the subsequent content without excluding the content that has been watched halfway. Furthermore, the information processing device 100 may preferentially select content that has been watched halfway. In this case, in step S5, it is possible to search for and determine the selection candidate content from contents other than the content corresponding to the current time zone.

Furthermore, in a case where there is a plurality of serial drama series, the content with the highest priority may be selected, and then respective series of drama may be displayed in the item images. In this case, in a case where the user designates another serial drama series, processing in which the content having the highest priority among the another serial drama series is selected and played back, and then other episodes in the series are displayed as item images may be performed. Furthermore, in a case where a viewing user can be identified by voice recognition or the like, the information processing device 100 can implement personalized playback control by referring to the viewing history of the viewing user and referring to the viewing state of the viewing user regarding the searched content.

As described above, the information processing device 100 searches for content, and in a case where a plurality of contents has been searched for, automatically selects the image G1 of the display content having the highest possibility of being requested by the user according to a predetermined criterion and displays the image G1 on the display screen, and displays the TV menu G2 corresponding to the selection candidate contents as the search result. As a result, even in a case where there is a plurality of selection candidates, the content is automatically selected and displayed, so that the user's trouble is saved and the user can easily view the desired content. In addition, by displaying the TV menu G2 corresponding to the selection candidate contents, it is possible to support the user selecting another content, so that the user can easily select and view the desired content.

1-6. Second Display Process at the Time of Selecting Usual Filter: Usual Program Guide Next, the second display process at the time of selecting a usual filter according to the first embodiment will be described with reference to FIG. 9. FIG. 9 is a flowchart illustrating a flow of the second display process at the time of selecting a usual filter according to the first embodiment.

As illustrated in FIG. 9, the control unit 160 of the information processing device 100 determines whether the TV menu G2 at the time of selecting a usual filter is displayed (step S21). When the TV menu G2 at the time of selecting a usual filter is displayed on the display 108 (YES in step S21), it is determined whether a first input operation has been performed (step S22). An example of the first input operation includes a pressing operation of a down button provided in the remote controller.

In a case where the first input operation has not been performed (NO in step S22), a certain period of time (for example, about several seconds to several tens of seconds) has elapsed from display of the TV menu at the time of selecting a usual filter, and a timeout has occurred (YES in step S23), the display control unit 166 performs control to end display of the TV menu G2 (step S24). On the other hand, when the first input operation is performed (YES in step S22), the display control unit 166 ends the display of the TV menu G2, and performs control to output the usual program guide G3 to display it on the display 108 (step S25).

Next, the control unit 160 determines whether another channel has been selected by the user's input operation (step S26). When another channel is selected by the user's input operation (YES in step S26), the selection control unit 164 selects the selected another channel as the display channel, and the display control unit 166 performs control to display the image (video) G1 of the display content of the selected display channel on the display 108 (step S27), and ends the display of the usual program guide G3 (step 28).

On the other hand, when another channel is not selected by the user's input operation (NO in step S26), the control unit 160 determines whether there is a second input operation (step S29). When the second input operation is performed (YES in step S29), display control unit 166 ends the display of the usual program guide G3, and performs a process of displaying the original TV menu G2 on the display 108 (step S30). Thereafter, the process returns to step S21. An example of the second input operation includes a pressing operation of an up button provided in the remote controller.

According to the second display process, it is possible to present the user with the selection candidate content that is highly likely to be desired by the user with the usual program guide G3, and thus, the user can avoid a complicated operation of selecting a channel and easily select and view the desired content. In addition, since it is possible to smoothly switch between the usual program guide G3 and the TV menu G2 at the time of selecting a usual filter, it is possible to improve user convenience. In addition, in steps S21 to S30 of the flowchart illustrated in FIG. 9, processing of switching between the usual program guide G3 and the TV menu G2 at the time of selecting a usual filter is described. When the first input operation is performed even in a case where a filter other than usual filter is selected in the TV menu G2, the display may be switched to the program guide on the entire screen corresponding to the filter other than the usual filter selected in the TV menu G2.

1-7. Third Display Process at the Time of Selecting Usual Filter: Voice Input Operation Next, the third display process (voice input operation) at the time of selecting a usual filter according to the first embodiment will be described with reference to FIG. 8. FIG. 8 is a flowchart illustrating a flow of the first display process at the time of selecting a usual filter according to the first embodiment.

In step S1 illustrated in FIG. 8, the input operation is an input operation by voice (voice input operation). In this voice input operation, when the information processing device 100 detects the user's utterance voice (for example, the "predetermined call"+"show me the usual program") using the microphone 102, the voice recognition unit 130 recognizes the voice input. The power supply state of the information processing device 100 at this time is a standby state in which a voice can be detected by the microphone 102 (that is, a state in which power is being supplied to the processor 112 and the microphone 102), and the display 108 is turned off (that is, a state in which power supply to the display 108 is not performed). After voice input recognition in step S1, processing similar to that in FIG. 8 is performed in and after step S2 of turning on the power.

For example, when the user utters the "predetermined call"+"show me the usual program" in step S1, the power is turned on in step S2, and the image G1 of the display content and the TV menu G2 corresponding to the selection candidate contents are displayed in step S7 after steps S3 to S6 (see FIG. 4). The user can activate the device from the standby state by the voice input, and the image G1 of the desired display content and the TV menu G2 corresponding to the selection candidate contents are automatically displayed on the screen. As a result, the user can more easily activate the information processing device 100 by the voice input operation, avoid a complicated operation of selecting a channel, and more easily view the desired content. Note that, in step S1, in a case where the user utters a request for a program to be regularly viewed, such as the "predetermined call"+"show me the usual program", after the power is turned on in step S2, the process may proceed to the content determination process in step S4 without determining whether the power is turned on after the predetermined elapsed time or more in step S3. In this case, in a case where the user has uttered to turn on the power of the television, such as the "predetermined call"+"turn on the television" in step S1, the determination process in step S3 may be performed.

Note that the reception of the utterance of the user may be started without a predetermined call by the user performing the input operation on a button or the like disposed in the remote controller or performing the input operation on a mobile terminal such as a smartphone. Furthermore, the voice reception may be performed not by the information processing device 100 but by the remote controller or the smartphone. Furthermore, the voice input can be received by a voice device (for example, a smart speaker) connected to the information processing device 100. The voice device may transmit the detected user voice to a voice recognition server on the cloud. In this case, the information processing device 100 is automatically powered on by a control signal transmitted from a voice device or a server on the cloud, and displays the content requested by the user.

Furthermore, after activation according to the utterance (or input operation) of the user, the control unit 160 may determine whether the setting for STB viewing is completed in a case where the STB is connected to the information processing device 100, and execute the viewing process by the STB in a case where the setting for STB viewing is completed, or execute the viewing process by the information processing device 100 (built-in tuner) in a case where the setting for STB viewing is not completed. That is, the processing can be changed according to the setting status of the connected device.

As described above, even in the standby state, the information processing device 100 can receive a voice input by the user, and can turn on the power and display the content requested by the user when the voice input (content output instruction) requesting the content playback is detected. Therefore, the user can more easily activate the information processing device 100 by the voice input operation, avoid complicated operation of selecting a channel, and more easily view the desired content.

1-8. Usual Filter Setting Screen

Figure 10:
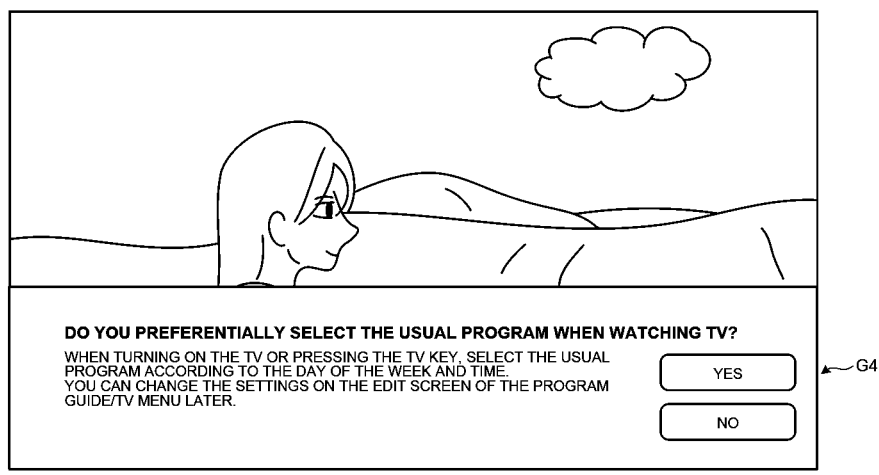
FIG. 10 is a first diagram for describing a usual filter setting screen according to the first embodiment.
Figure 11:
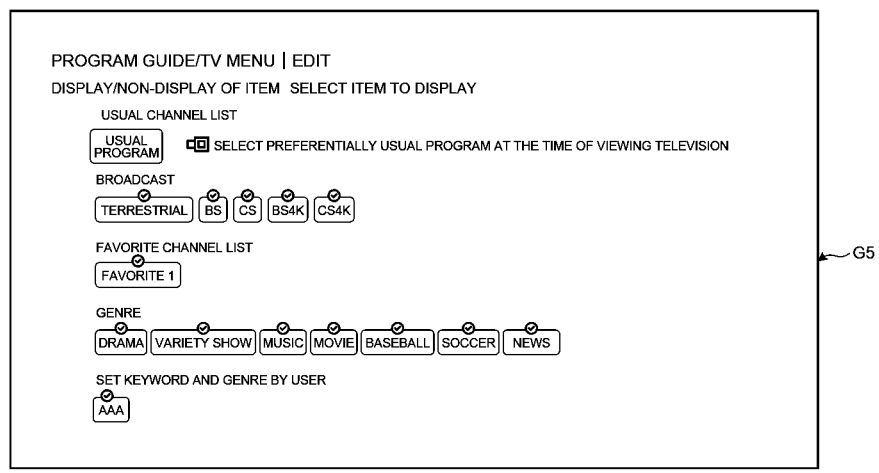
FIG. 11 is a second diagram for describing a usual filter setting screen according to the first embodiment.

Next, a usual filter setting screen (setting image) according to the first embodiment will be described with reference to FIGS. 10 and 11. FIG. 10 is a first diagram for describing the usual filter setting screen according to the first embodiment. FIG. 11 is a second diagram for describing the usual filter setting screen according to the first embodiment.

As illustrated in FIG. 10, the display control unit 166 performs a process of displaying a setting image G4 for checking whether to preferentially select a usual program in a partial region of the display 108. The control unit 160 sets whether to preferentially select a usual program in accordance with an input operation by the user. When the user performs an input operation of selecting "Yes", the user setting information includes information indicating that the usual program is preferentially selected, and when the user performs an input operation of selecting "No", the user setting information includes information indicating that the usual program is not preferentially selected. In a case where the user setting information includes information indicating that the usual program is preferentially selected, the control unit 160 performs a process of preferentially selecting the usual program. In this way, since the user can set whether to preferentially select a usual program, a degree of freedom of selection by the user is increased, and convenience of the user can be improved.

Furthermore, as illustrated in FIG. 11, the display control unit 166 performs a process of displaying a setting image G5 related to the usual channel list (usual filter) on the display 108. The setting image G5 is a user interface image (UI image), and when the user performs an input operation on the setting image G5, it is possible to set whether to preferentially select a usual program, a broadcast, a favorite channel list, a genre, a user input keyword or genre, and the like. Since the user can perform an input operation of selecting a desired element in each item and perform setting for each item, the degree of freedom of selection by the user is increased, and convenience of the user can be improved.

However, in the case of continuous TV viewing use (display within a predetermined time from previous activation), the display control unit 166 may restrict preferentially selecting a channel of a usual program, that is, the use of the usual filter. For example, it is possible to prevent the channel from changing when the user temporarily turns off the television and comes back, such as when the user use a rest room for a short time, so that the convenience of the user can be improved. In this case, for example, the setting image G5 may include an item that allows the user to set a predetermined time for which channel selection based on a usual filter is restricted.

In addition, in a case where a favorite filter (filter name: "favorite") has been last selected in the TV menu G2, for example, in a case where the favorite filter has been selected when the power is turned off, the display control unit 166 may restrict preferentially selecting a channel of a usual program, that is, the use of the usual filter. As a result, the favorite content can preferentially be displayed, so that the convenience of the user can be improved.

1-9. Summary of First Embodiment

As described above, according to the first embodiment, the information processing device 100 acquires the content selection information (for example, history information such as a viewing history and a recording reservation of the user, and preference information about the user) about the user, and acquires the content output instruction (for example, an instruction by a user's input operation or voice input operation) related to the content selection information. When acquiring the content output instruction, the information processing device 100 determines the display content and selection candidate information (selection candidate content) about the content based on the content selection information to output image G1 of the display content and the TV menu G2, which is an example of the first display image corresponding to the selection candidate information about the content to the display 108. As a result, it is possible to automatically present the user with the content that is highly likely to be desired by the user, so that the user can easily view the desired content. Furthermore, since it is possible to present the user with the selection candidate content that is highly likely to be desired by the user, the user can easily select and view the desired content.

Furthermore, the TV menu G2 at the time of selecting a usual filter is created based on one or both of the service (channel) and the content used by the user within a predetermined period (for example, one month). As a result, it is possible to reliably provide the content that is highly likely to be desired by the user according to one or both of the service and the content used by the user within the predetermined period, so that the user can easily select the desired content. As a result, the user can easily view the desired content.

In addition, the TV menu G2 at the time of selecting a usual filter changes according to one or both of the time zone and the day of the week. As a result, it is possible to provide the content that is highly likely to be desired by the user according to one or both of the time zone and the day of the week, so that the user can easily select the desired content. As a result, the user can easily view the desired content.

In addition, the TV menu G2 at the time of selecting a usual filter includes a plurality of pieces of selectable category information (for example, various filters) corresponding to one or both of the content acquisition means (for example, terrestrial broadcasting, satellite broadcasting, set top box (STB), HDMI (registered trademark), or the like) and the content type (for example, sports, drama, or the like). As a result, since the user can select category information, it is possible to perform a process corresponding to the category information selected by the user, and the degree of freedom of selection by the user can be increased to improve convenience of the user.

In addition, the TV menu G2 at the time of selecting a usual filter includes lower category information (for example, sport name, drama name, or the like) related to the content type (for example, sports, drama, or the like). In addition, the TV menu G2 at the time of selecting a usual filter includes lower category information (for example, team name or actor name) related to an element (for example, team or actor) included in the content. As a result, since the lower category information related to the type or element of the content is provided to the user, the user can grasp the lower category information related to the type or element of the content and easily select the desired content. As a result, the user can easily view the desired content.

In addition, in the TV menu G2 at the time of selecting a usual filter, content selection candidates (selection candidate contents) are disposed in an order based on the content selection information. As a result, the content selection candidates are disposed in an order suitable for the user and provided to the user, so that the user can easily select the desired content. As a result, the user can easily view the desired content.

In addition, the control unit 160 performs a process of switching from an output of the display content and the TV menu G2 at the time of selecting a usual filter to an output for displaying the usual program guide G3, which is an example of the third display image corresponding to the content information interface, on the entire screen based on the user input operation for the TV menu G2 at the time of selecting the usual filter. This makes it possible to provide a content selection candidate suitable for the user with the usual program guide G3, so that the user can easily select the desired content. As a result, the user can easily view the desired content.

In addition, the TV menu G2 at the time of selecting a usual filter and the usual program guide G3 include selectable category information (for example, usual filter "usual program") at corresponding positions. As a result, even when the TV menu G2 at the time of selecting a usual filter and the usual program guide G3 are switched, the category information is easily visually recognized, and the switching can be performed without discomfort, so that the convenience of the user can be improved.

In addition, in the usual program guide G3, content selection candidates (selection candidate contents) are disposed in an order based on the content selection information. As a result, the content selection candidates are disposed in an order suitable for the user and provided to the user, so that the user can easily select the desired content. As a result, the user can easily view the desired content.

Furthermore, the control unit 160 performs a process of outputting the setting images G4 and G5, which are examples of the setting information for selecting to display the image G1 of the display content selected based on the content selection information at the time of activation, and a process of displaying the image G1 of the display content selected based on the content selection information at the time of activation based on user selection for the setting images G4 and G5. As a result, the user can select whether to display the image G1 of the display content selected based on the content selection information at the time of activation, and thus, it is possible to increase the degree of freedom of selection by the user and improve convenience of the user.

Furthermore, the content output instruction may be an utterance of the user. As a result, the user can more easily output the image G1 of the display content and the TV menu G2 to the display 108 by the voice input operation, so that the user can more easily view the desired content.

Furthermore, the control unit 160 performs a process of identifying the user based on the utterance of the user, and in the process of determining the display content and the selection candidate information (selection candidate content) of the content, determines the display content and the selection candidate information about the content based on the content selection information about the identified user. As a result, since the content selection information suitable for the user is used, it is possible to more reliably present the selection candidate content that is highly likely to be desired by the user to the user. As a result, the user can easily select and view the desired content.

2. Second Embodiment

The second embodiment is different from the first embodiment in a display screen at the time of selecting a genre filter and a process related to the display screen. Hereinafter, differences from the first embodiment will be mainly described.

Figure 12:
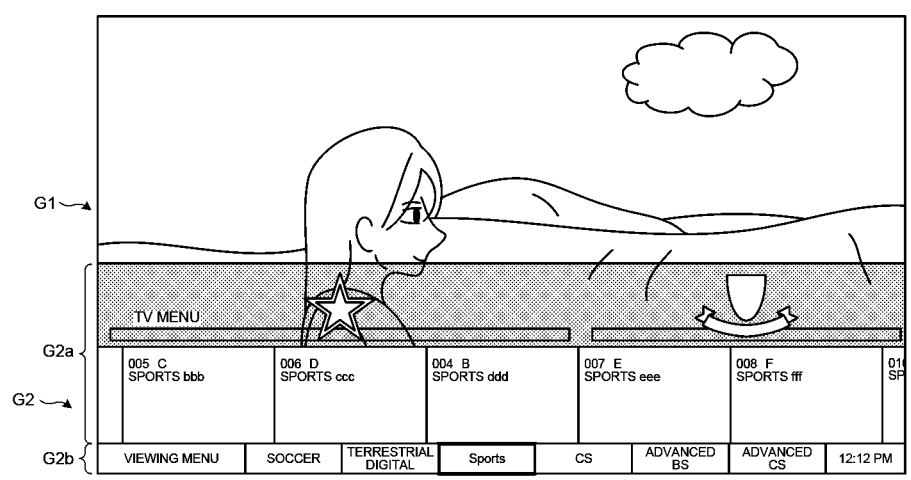
FIG. 12 is a diagram for describing a first display screen at the time of selecting a genre filter according to a second embodiment.
Figure 13:
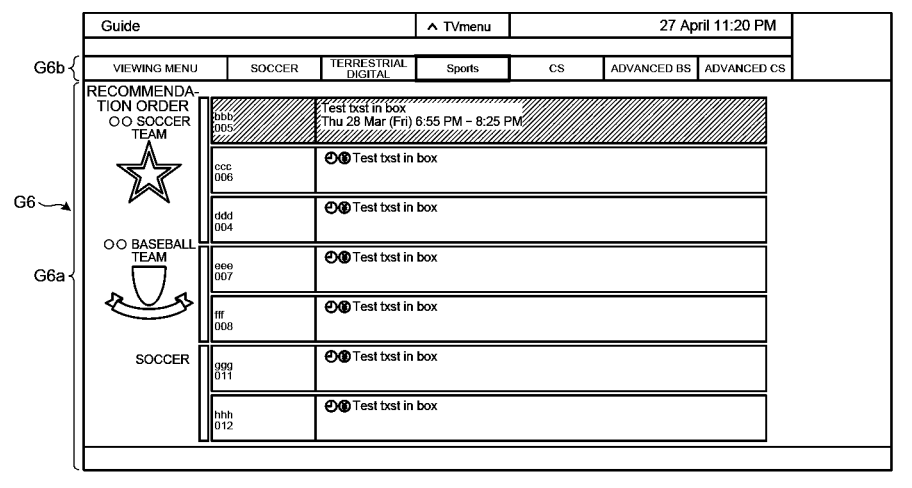

2-1. Display Screen at the Time of Selecting Genre Filter: TV Menu, Preference Program Guide The first display screen (TV menu: second display image) at the time of selecting a genre filter according to the second embodiment will be described with reference to FIG. 12, and the second display screen (preference program guide: third display image) at the time of selecting a genre filter will be described with reference to FIG. 13. FIG. 12 is a diagram for describing the first display screen at the time of selecting a genre filter according to the second embodiment. FIG. 13 is a diagram for describing the second display screen at the time of selecting a genre filter according to the second embodiment.

As illustrated in FIG. 12, for example, the image G1 of the display content is displayed on the entire screen of the display 108, and the TV menu G2 is displayed in the lower region of the screen of the display 108. The TV menu G2 is a user interface image (UI image) having an image G2a indicating the first selection column and an image G2b indicating the second selection column. The image G2a indicating the first selection column is an image in which item images corresponding to selection candidate contents of respective channels are disposed and indicated in a selectable manner in the horizontal direction of the screen of the display 108. The image G2a also includes, for example, an emblem image of a team corresponding to the selection candidate content. The image G2b indicating the second selection column is an image in which filter names (category information) of respective types are disposed and indicated in a selectable manner in the horizontal direction of the screen of the display 108. In FIG. 12, for example, "soccer", "terrestrial digital", "sports", "CS", "advanced BS", "advanced CS", and the like are illustrated as filter names.

Here, as in the first embodiment, for example, in the TV menu G2 described above, when any of the item images is selected by the user's input operation, the image G1 of the display content is switched to the content image of the channel based on the selected item image. When any of the filters is selected, the image G1 of the display content is switched to the content image corresponding to the selected filter, and the TV menu G2 corresponding to the selected filter is displayed.

For example, in a case where a sports filter (filter name in FIG. 12: "sports") which is a genre filter is selected, the display content and the selection candidate content (content selection candidate information) are determined based on the preference information included in the content selection information. Then, as illustrated in FIG. 12, the image G1 of the determined display content is displayed on the entire screen of the display 108, and further, the TV menu G2 having item images corresponding to the determined selection candidate contents and respective filter names are displayed in the lower region of the screen of the display 108. The respective item images are disposed in the screen of the display 108 in the horizontal direction in order of priority in the TV menu G2. For example, the respective item images are disposed in descending order of priority from the left. Further, the emblem image of the team is also displayed at the position corresponding to the selection candidate content. For example, in addition to the illustration corresponding to the selection candidate information such as the emblem image of the team, related information such as an image or an explanatory sentence corresponding to the selection candidate information such as a picture of a player belonging to the team or an explanatory sentence of the team may be displayed. The related information may be displayed so as to indicate that the related information is commonly related to the plurality of pieces of selection candidate information.

In addition, in a state where the sports filter (filter name in FIG. 12: "sports") is selected, for example, when a predetermined input operation (as an example, a pressing operation of a down button provided in the remote controller) is received, a preference program guide G6 is displayed on the entire screen of the display 108 as illustrated in FIG. 13. The preference program guide G6 is a user interface image having a program guide image G6a and an image G6b indicating the selection column. Program guide image G6a is an image in which item images corresponding to the selection candidate contents determined as described above are disposed. The respective item images are disposed in the screen of the display 108 in the longitudinal direction in order of priority in the program guide image G6a. For example, the respective item images are disposed in descending order of priority. In addition, the image G6b indicating the selection column is an image in which filter names (category information) of respective types are disposed and indicated in a selectable manner in the horizontal direction of the screen of the display 108. The image G6b indicating the selection column is displayed in the upper region of the screen of the display 108. In FIG. 13, as in FIG.

12, for example, "soccer", "terrestrial digital", "sports", "CS", "advanced BS", "advanced CS", and the like are illustrated as filter names.

Here, the TV menu G2 and the preference program guide G6 have the sports filter (filter name in FIG. 12: "sports") at positions corresponding to each other. In the TV menu G2 and preference program guide G6, the corresponding positions represent, for example, the same positional relationship in the column direction in which the filter names are disposed. Furthermore, the corresponding positions represent, for example, a positional relationship in which in a case where the TV menu G2 is displayed in the lower region of the screen of the display 108, the image G6b of the preference program guide G6 is displayed in the upper region (the display region opposite to the display region of the TV menu G2 on the screen of the display 108) of the screen of the display 108.

Note that, it is possible to apply a display mode similar to that of the TV menu G2 or the respective item images of the usual program guide G3, that is, the display mode according to the first embodiment, to the respective item images of the preference program guide G6, and for example, channel information, a content name (program title or the like), a content outline, or information indicating whether the content is a current broadcast program, whether it is a recorded program, whether it is a VOD item, whether it is an Internet distributed program, or the like may be displayed, or a still image or a moving image thumbnail may be displayed.

Furthermore, the genre filter (see FIGS. 12 and 13) may be included in the selection column including the usual filter (see FIGS. 4 and 5) in the TV menu G2 or the usual program guide G3. That is, the TV menu G2 or the usual program guide G3 may include the genre filter in addition to the usual filter in the selection column. For example, the TV menu G2 (the TV menu G2 in which the usual filter is selected) determined based on the content selection information is displayed at the time of activation, and the TV menu G2 includes the genre filter.

2-2. Priority at the Time of Selecting Genre Filter

Figure 15:
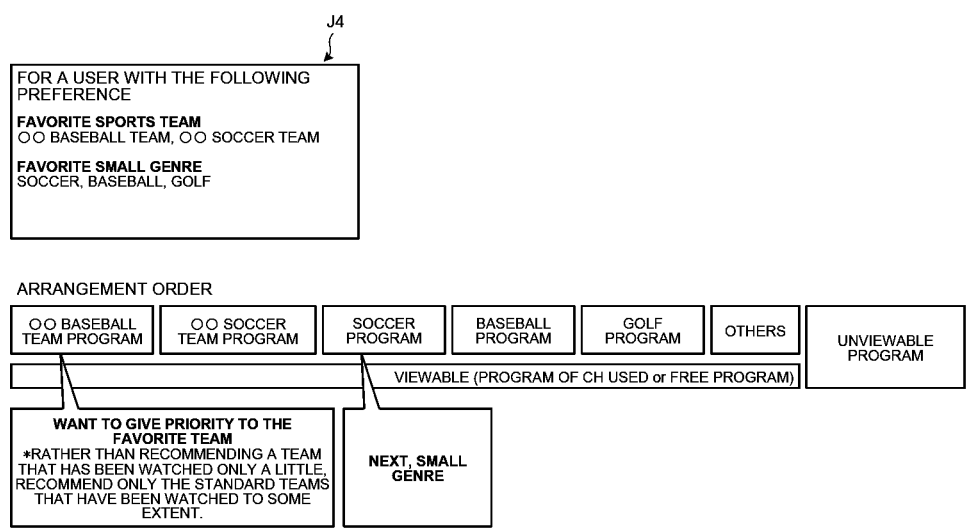
FIG. 15 is a second diagram for describing priority at the time of selecting a genre filter according to the second embodiment.

Next, priority at the time of selecting a genre filter according to the second embodiment will be described with reference to FIGS. 14A, 14B, 14C, 14D, and 15. FIGS. 14A, 14B, 14C, and 14D are first diagrams for describing priority at the time of selecting a genre filter according to the second embodiment. FIG. 15 is a second diagram for describing priority at the time of selecting a genre filter according to the second embodiment.

As illustrated in FIGS. 14A, 14B, 14C, and 14D, the selection control unit 164 changes the priority for determining the display order of the item images in the TV menu G2 according to the information amount of the content selection information. In a case where the preference information is obtained from the history information included in the content selection information, it is determined that the longer the viewing time of the content is, the more the user likes the content, the information about the content is added to the preference information, and the preference information is updated. That is, the preference of the user is learned from the history information and the information is acquired, and the acquired information is reflected in the preference information about the user. Therefore, as the information amount of the history information increases, the information amount of the preference information also increases. Note that the preference information is not only obtained from the history information, but may be set by a user's input operation.

In a case where the information amount of the preference information is insufficient, as illustrated in FIG. 14A, the priority of the "viewable channel" is set higher than that of the "unviewable channel". When the information amount of the preference information exceeds a first predetermined value, as illustrated in FIG. 14B, the "favorite small genre" is set in the "viewable channel", and the priority of the "favorite small genre" is set to be the highest in the "viewable channel". When the information amount of the preference information exceeds a second predetermined value (>the first predetermined value), as illustrated in FIG. 14C, the "favorite team" in addition to the "favorite small genre" is set in "viewable channel", and the priority of the "favorite team" is set to be the highest "in the viewable channel". Alternatively, as illustrated in FIG. 14D, only "favorite team" is set in the "viewable channel", and the priority of the "favorite team" is set to the highest "in the viewable channel".

When the information amount of the preference information exceeds the second predetermined value, for example, as illustrated in FIG. 15, as preference information J4 of the user, the "favorite sports team" of the user is set to "* baseball team" and "* soccer team", and the "favorite small genre" of the user is set to "soccer", "baseball", and "golf". The priority of the "favorite sports team" is higher than that of the "favorite small genre". In addition, the "favorite sports team" and the "favorite small genre" are disposed in descending order of priority from the left in FIG. 15. That is, the priority of the "* baseball team" is higher than that of the "* soccer team", the priority of "soccer" is higher than that of "baseball" and that of "golf", and the priority of "baseball" is higher than that of "golf". The preference information J4 of the user is stored in the preference DB 174 for each user. Note that there is sports as a category, there are baseball, soccer, and golf as a lower category thereof, and there is team as a lower category thereof.

The priority of the channel and the program (content) is determined by the selection control unit 164 based on such preference information J4. For example, channels and programs obtained from a program guide on the Internet, an electronic program guide from each broadcasting station, or the like are sorted in order of priority as illustrated in FIG. 15 (lower part) based on preference information J4 as illustrated in FIG. 15 (upper part), and are sorted in descending order of priority from the left in FIG. 15, for example. The priority of the "program that can be watched (for example, the program of the channel being used or the free program)" is higher than that of the "program that cannot be viewed". In addition, in the "program that can be watched", the priority is lowered in the order of the "* baseball team program", the "* soccer team program", the "soccer program", the "baseball program", the "golf program", and "others". Respective selection candidate contents are disposed based on such priority, and the TV menu G2 having item images corresponding to the disposed selection candidate contents is generated.

Note that the filter includes drama, variety show, movie, music, and the like in addition to sports as in the first embodiment described above. For example, in the drama, an original author name as a favorite original author or an actor name may be set, and the domestic drama may be set as a favorite small genre. An entertainer name may be set in the variety show, and a singer name may be set in the music.

2-3. First Display Process at the Time of Selecting Genre Filter: TV Menu

Figure 16:
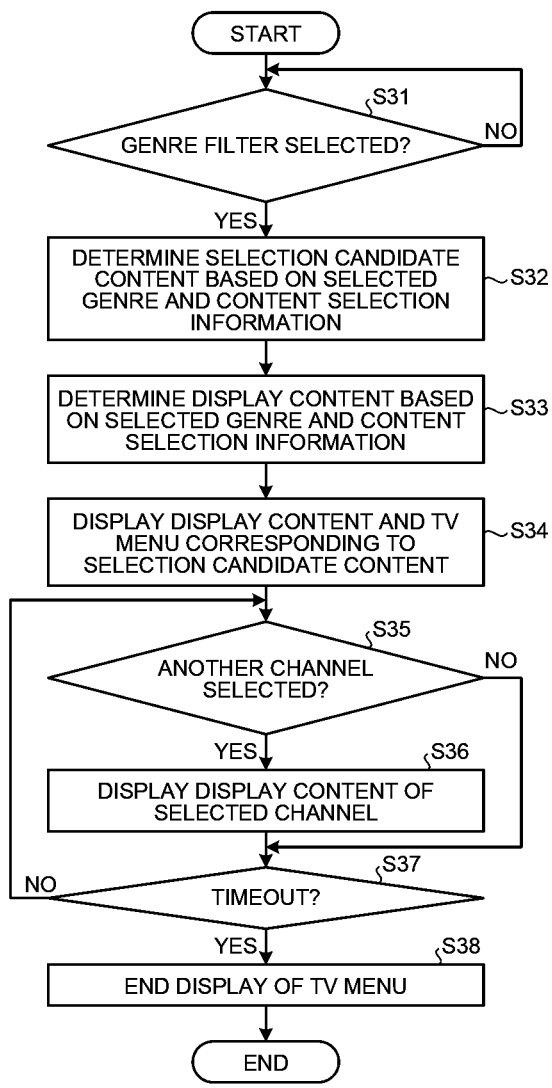
FIG. 16 is a flowchart illustrating a flow of a first display process at the time of selecting a genre filter according to the second embodiment.

Next, the display process performed by the information processing device 100 according to the second embodiment, that is, the first display process (TV menu) at the time of selecting a genre filter will be described with reference to FIG. 16. FIG. 16 is a flowchart illustrating a flow of the first display process at the time of selecting a genre filter according to the second embodiment.

As illustrated in FIG. 16, the control unit 160 of the information processing device 100 determines whether a genre filter in the TV menu G2 is selected (step S31). When the genre filter in the TV menu G2 is selected (YES in step S31), the search control unit 162 searches for and determines the selection candidate content from a plurality of contents corresponding to the current time zone based on the genre related to the selected genre filter, that is, the selected genre and the content selection information (for example, preference information) (step S32). The selection control unit 164 selects and determines one display content (content to be displayed on the entire screen of the display 108) from among the selection candidate contents obtained by the search by the search control unit 162 based on the selected genre and the content selection information (step S33).

The display control unit 166 performs a process (channel selection) of displaying the image G1 (video) of the display content selected by the selection control unit 164 on the display 108 and a process of generating the TV menu G2 corresponding to one or more selection candidate contents and displaying the TV menu G2 on the display 108 (step S34). For example, the selection control unit 164 sets the priority of a favorite sport, a sports team, or the like to be high based on the content selection information, and sets the content having the highest priority as the display content. In addition, the display control unit 166 generates the TV menu G2 by disposing the item images corresponding to respective selection candidate contents in order of priority.

Next, the selection control unit 164 determines whether another channel has been selected by the user's input operation (step S35). When another channel is selected by the user's input operation (YES in step S35), the selection control unit 164 determines the selected another channel as the display channel, and the display control unit 166 performs a process of displaying the image (video) G1 of the display content of the determined display channel on the display 108 (step S36). Thereafter, when a certain period of time (for example, about several seconds to about several tens of seconds) has elapsed from the display of the TV menu G2 or the selection of another channel and a timeout occurs (YES in step S37), the display control unit 166 performs a process for ending the display of the TV menu G2 (step S38).

Note that the final channel selection result together with time information and identification information about the user is stored in the history DB 172 as a viewing history of the user, and is also stored in the preference DB 174 as the preference information, and is used when the priority is calculated by the selection control unit 164 at the time of the next channel selection. By repeating such processing, the information about the viewing history and the preference of the user is accumulated, and the selection candidate content is obtained based on the history information and the preference information in which the information amount is increased. As a result, since the possibility that the selection candidate content is a content desired by the user is improved, the user can view the desired content more reliably.

According to the first display process as described above, in the determination of the content selection candidate information, the content is searched for based on the selected genre and the content selection information (for example, preference information) of the user, and the content obtained by the search is determined as the selection candidate content. In the determination of the display content, the priority of each selection candidate content is determined based on the content selection information about the user, and the channel having the highest priority is determined as the display content. In addition, respective selection candidate contents are disposed in order of priority, the TV menu G2 including item images corresponding to respective selection candidate contents disposed in order of priority and filter names is created, and the TV menu G2 is displayed together with the image G1 of the display content.

In this way, since the content that is highly likely to be desired by the user is automatically presented to the user, the user can view the desired content without executing a complicated operation of selecting the channel. As a result, the user can easily view the desired content. In a case where the display content is not the content desired by the user, the user immediately selects the channel again. Even in this case, since the TV menu G2 corresponding to the selection candidate contents is displayed, the user can visually recognize the TV menu G2 and change the content (channel change). As a result, the user can easily select and view the desired content.

Note that the display content is automatically selected at the time of selecting a genre filter, and the image of the selected content is displayed on the display 108, but the present invention is not limited to this, and the display content may not be selected, and the image of the content being displayed may be displayed as it is. That is, the process in step S33 and the display content display process in step S34 illustrated in FIG. 16 may not be performed. However, in a case where that the genre filter is automatically selected at the time of activation is set, the display content may be automatically selected at the time of selecting a genre filter, and the image of the selected content may be displayed on the display 108.

2-4. Second Display Process at the Time of Selecting Genre Filter: Preference Program Guide Next, the second display process at the time of selecting a genre filter according to the second embodiment will be described with reference to FIG. 9. FIG. 9 is a flowchart illustrating a flow of the second display process at the time of selecting a usual filter according to the first embodiment.

In step S21 illustrated in FIG. 9, the control unit 160 of the information processing device 100 determines whether the TV menu G2 at the time of selecting a genre filter is displayed. Since the processing similar to that in FIG. 9 is performed except for the process in step S21, the description thereof will be omitted. However, the "usual program guide" in steps S25, S28, and S30 illustrated in FIG. 9 is changed to the "preference program guide".

According to the second display process, it is possible to present the user with the selection candidate content that is highly likely to be desired by the user with the preference program guide G6, and thus, the user can avoid a complicated operation of selecting a channel and easily select and view the desired content. In addition, since it is possible to smoothly switch between the preference program guide G6 and the TV menu G2 at the time of selecting a usual filter, it is possible to improve user convenience.

2-5. Recommendation Display of Preference Program Guide

Figure 17:
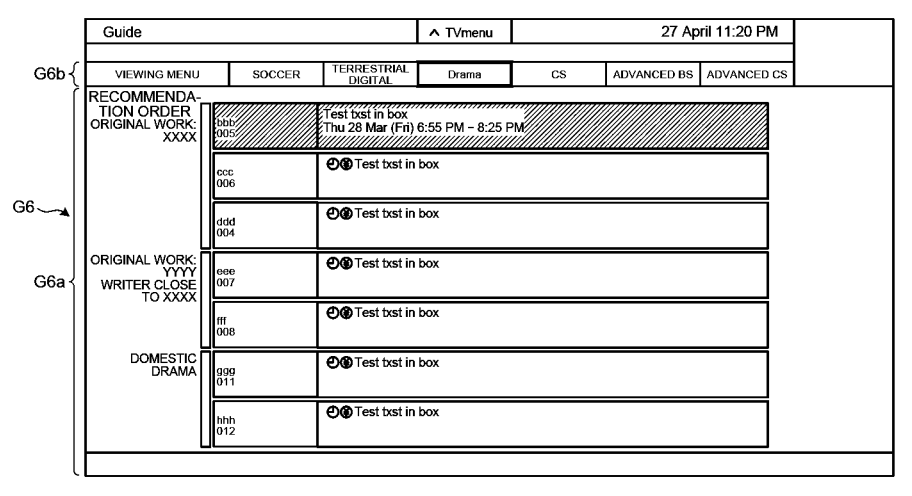

Next, recommendation display of a preference program guide according to the second embodiment will be described with reference to FIG. 17. FIG. 17 is a second diagram for describing a second display screen (preference program guide) at the time of selecting a genre filter according to the second embodiment.

For example, the search control unit 162 searches for a content (program) that the user is likely to be interested in by using big data (huge data group) or the like obtained from the outside via a network based on the preference information about the user. The display control unit 166 adds and recommends the contents obtained by the search by the search control unit 162 to the preference program guide G6.

For example, in a case where an original author name as a favorite original author is included in the preference information, another author (for example, an author whose user does not known) related to the original author is recommended from the big data. Specifically, as illustrated in FIG. 17, in the preference program guide G6, "XXXX" that is a favorite original author is displayed, and contents related to "YYYY" that is a writer (for example, an author whose works created are close in content) close to the original author "XXXX" is displayed. As a result, it is possible to recommend an author that the user is likely to be interested in (likely to like) and to provide the content of another author (original author) to a user who views only the content of a specific original author. At this time, instead of providing a content that the user is not interested in, the content that the user is likely to be interested in is presented, and thus, it is possible to widen a selection range for selecting a content desired by the user and improve convenience of the user. Note that, even in a case where an entertainer name as a favorite entertainer is included in the preference information, or the like, similar processing can be performed.

Furthermore, for example, in a case where an original author name as a favorite original author is included in the preference information, a keyword (for example, reversal, difficult situation, and the like) that is frequently included in the description of the drama of the original author may be obtained from the big data, and the content corresponding to another drama described by the obtained keyword may be recommended. In a case where a movie name as a favorite movie is included in the preference information, a keyword (for example, space, physics, and the like) largely included in the description of the movie may be obtained, and the content corresponding to another movie described by the obtained keyword may be recommended. Furthermore, in a case where an entertainer name as a favorite entertainer is included in the preference information, a face image of the stored entertainer may be analyzed and compared with a face image of another entertainer, an entertainer resembling the stored entertainer may be identified, and the content in which the identified entertainer appears may be recommended. In addition, for example, related information including an illustration, a photograph, or an explanatory sentence, such as an image of a recommended entertainer or a biographic introduction of a writer, may be displayed in the preference program guide G6 in association with a plurality of contents. Furthermore, a GUI for presenting a screen displaying information about a recommended writer or entertainer may be displayed in the preference program guide G6 in association with a plurality of contents. Displaying the GUI in association with the plurality of contents may include displaying the GUI in association with a group of contents (for example, a group of contents sorted by the vertical bar illustrated in FIG. 17) displayed in association with a writer or an entertainer on the preference program guide G6.

Note that the content obtained by the search is added to the preference program guide G6 and recommended as described above, but the present invention is not limited to this, and for example, the content may be added to the usual program guide G3 and recommended. In addition, the TV menu G2 may include recommended content corresponding to the preference program guide G6 or the usual program guide G3.

2-6. Summary of Second Embodiment

As described above, according to the second embodiment, the control unit 160 performs the process of outputting the TV menu G2, which is an example of the second display image corresponding to the content selection candidate information (for example, the selection candidate content) according to the category information, based on the user selection corresponding to the category information (for example, various filters). As a result, since it is possible to present the user with the selection candidate content according to the category information that is highly likely to be desired by the user, the user can easily select and view the desired content.

In addition, in the TV menu G2 at the time of selecting a genre filter, content selection candidates (selection candidate contents) are disposed in an order based on the content selection information. As a result, the content selection candidates are disposed in an order suitable for the user and provided to the user, so that the user can easily select the desired content. As a result, the user can easily view the desired content.

In addition, the control unit 160 performs a process of switching from an output of the display content and the TV menu G2 at the time of selecting a usual filter to an output for displaying the preference program guide G6, which is an example of the third display image corresponding to the content information interface, on the entire screen based on the user operation for the TV menu G2 at the time of selecting the usual filter. As a result, it is possible to provide a content selection candidate suitable for the user with the preference program guide G6, so that the user can easily select the desired content. As a result, the user can easily view the desired content.

In addition, in the preference program guide G6, content selection candidates (for example, selection candidate contents) are disposed in an order based on the content selection information. As a result, the content selection candidates are disposed in an order suitable for the user and provided to the user, so that the user can easily select the desired content. As a result, the user can easily view the desired content.

In addition, in the preference program guide G6, selection candidates are added and recommended based on the content selection information. As a result, since it is possible to present the content that the user is likely to be interested in, it is possible to increase a selection range for selecting the content desired by the user and to improve convenience of the user.

3. Other Embodiments 3-1. Various Settings by Control Panel

Next, various settings by a control panel according to other embodiments will be described.

The control panel may have a user interface image for standard definition (SD) program non-display setting. By default, the setting is OFF. When the SD program non-display setting is set to ON, the SD program is not displayed in the TV menu G2. As a result, it is possible to suppress simultaneous display of programs having different resolutions of high definition (HD) or SD but the same program content. That is, one of the programs having different resolutions but the same content may be deleted from the TV menu.

Note that not only one of the programs having different resolutions but the same content but also a program (content) not desired by many people may be deleted from the TV menu. In addition, an unsubscribed program, a data broadcast program, a program with a long program promotion, a program that cannot be viewed (program with no signal), a program in languages that the user cannot enjoy or understand (particularly, multi-language countries), and a program that cannot be viewed in a predetermined time zone (unique to the United States) may be deleted. Alternatively, a plurality of elements may be selectively displayed, such as which of subtitle and voice dubbing is displayed in the TV menu.

As described above, since the user can perform various settings, the TV menu G2 at the time of selecting a usual filter and the TV menu G2 at the time of selecting a genre filter can be customized according to the user's preference. As a result, it is easier for the user to select the content desired by the user, so that the user can view the content desired by the user more reliably, and, as a result, the convenience of the user can be improved.

3-2. Selectable Display of Usual Filter

Figure 18:
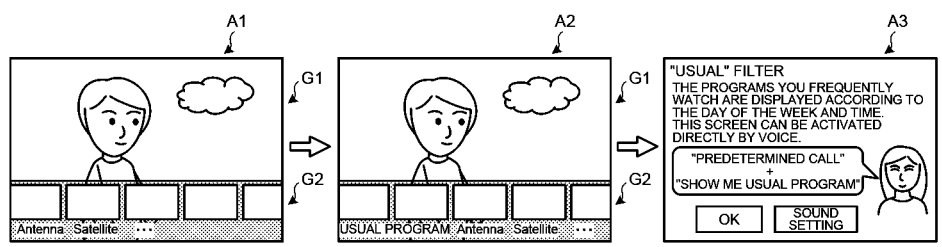
FIG. 18 is a diagram for describing a selectable display of a usual filter according to another embodiment.

Next, the selectable display of the usual filter will be described with reference to FIG. 18. FIG. 18 is a diagram for describing the selectable display of a usual filter according to another embodiment.

In a case where the information amount of the content selection information (for example, the operation log) is equal to or less than the predetermined amount, as illustrated in the screen A1 of FIG. 18, the display control unit 166 performs a process of not including the "usual program", which is the filter name of the usual filter, in the initial setting TV menu (the TV menu other than a TV menu at the time of selecting a usual filter) G2. On the other hand, when the information amount of the content selection information exceeds the predetermined amount, as illustrated in the screen A2 in FIG. 18, the display control unit 166 performs a process of automatically including the "usual program" in the initial setting TV menu G2.

Furthermore, in a case where the "usual program" is selected for the first time on the screen A2 in FIG. 18, as illustrated in a screen A3 in FIG. 18, an image that introduces the function of the usual filter may be displayed, or the function of the usual filter may be introduced by voice. Note that, in a case where the information amount of the content selection information is equal to or less than the predetermined amount, in order to store the content selection information, an image prompting to store the content selection information may be displayed, or a voice prompting to store the content selection information may be output.

As described above, in the initial setting the TV menu G2, when the information amount of the content selection information is equal to or less than the predetermined amount, the selectable category information (for example, the "usual program" of the usual filter) for selecting the usual filter is not disposed, and when the information amount of the content selection information exceeds the predetermined amount, the selectable category information for selecting the usual filter is disposed. As a result, when the information amount of the content selection information exceeds the predetermined amount, the user can select the usual filter, so that the processing based on the content selection information having a sufficient information amount is executed. That is, it is possible to determine whether to display an image of selectable category information corresponding to a usual filter based on the usage condition of the device. Therefore, since the content desired by the user can be more reliably provided, the user can easily view the desired content.

Note that, as described above, the display/non-display of the selectable category information for selecting a usual filter (outputting the TV menu G2 at the time of selecting a usual filter) is controlled, but the present invention is not limited to this, and for example, the display/non-display of the selectable category information for selecting a genre filter (outputting the TV menu G2 at the time of selecting a genre filter) may be similarly controlled.

3-3. Customization of Usual Program Guide

Figure 19:
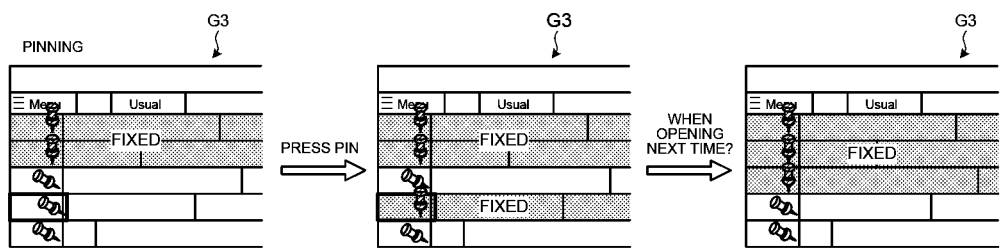
FIG. 19 is a first diagram for describing customization of a usual program guide according to another embodiment.
Figure 20:
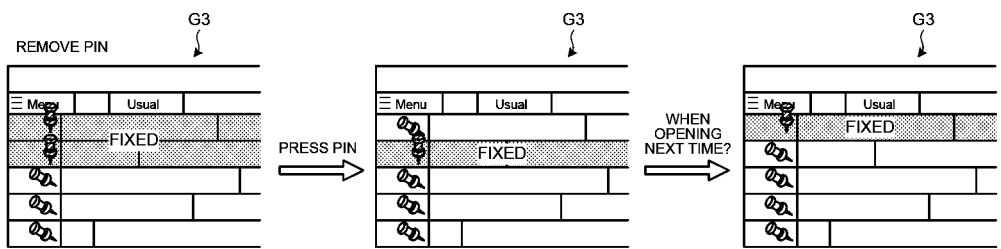
FIG. 20 is a second diagram for describing customization of a usual program guide according to another embodiment.
Figure 21:
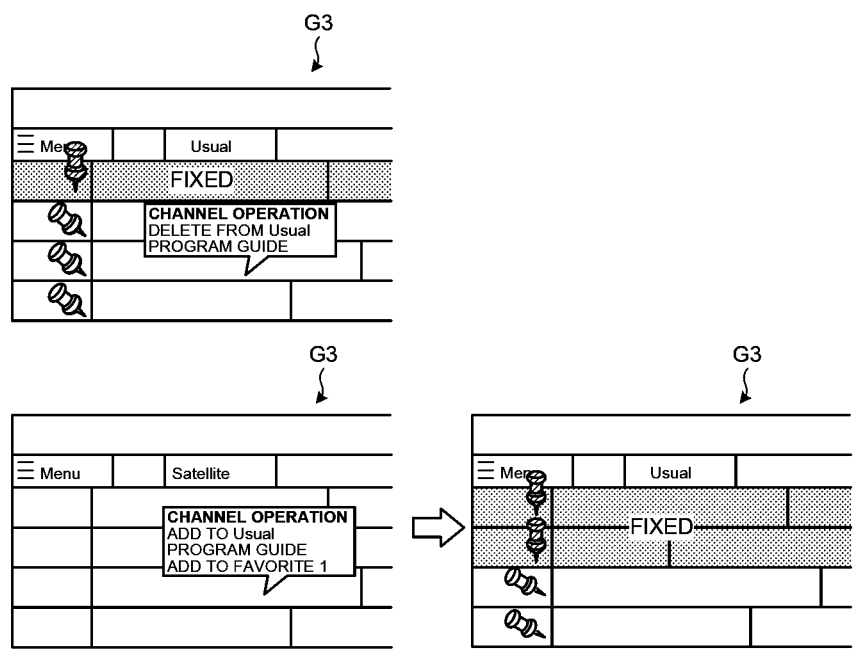
FIG. 21 is a third diagram for describing customization of a usual program guide according to another embodiment.

Next, customization of a usual program guide according to another embodiment will be described with reference to FIGS. 19 to 21. FIG. 19 is a first diagram for describing customization of a usual program guide according to another embodiment. FIG. 20 is a second diagram for describing customization of a usual program guide according to another embodiment. FIG. 21 is a third diagram for describing customization of a usual program guide according to another embodiment. Note that FIGS. 19 to 21 illustrate part of a usual program guide.

Sometimes the user is not satisfied with the usual program guide G3 (for example, a list of frequently viewed channels and programs). In this case, it may be possible to customize the usual program guide G3 according to the input operation by the user. For example, the display control unit 166 performs a process of customizing the usual program guide G3 according to the input operation. Note that the display control unit 166 may perform a process of customizing the preference program guide G6 other than the usual program guide G3. In addition, a result of customization with respect to the usual program guide G3 and the preference program guide G6 may be reflected in presentation of the selection candidate content in the TV menu G2.

As a case of customization, for example, there is a case where it is necessary to delete the content. The case where the deletion is necessary is a case where a channel or a program that is not desired to be displayed is displayed. Examples of the channel or the program that is not desired to be displayed include a channel or a program that does not want the family to watch, a channel or a program that is not interesting after being viewed for a trial, and a channel or a program whose subscription has been cancelled. In addition, there is a case where rearrangement of the content is necessary. As a case where rearrangement is necessary, there is a case where there is a favorite channel or a favorite program although it is not often watched. For example, since a channel or a program that the user does not really watch but the user likes is present at the bottom of a usual program guide, and difficult to find, the user may want to move the content to the top. In addition, there is a case where it is necessary to add the content. As a case where it is necessary to add the content, for example, there is a case where a channel or program that has not been watched for a while (has not been watched recently) disappears from a usual program guide.

As illustrated in FIG. 19, in a case where the user displays a customized screen of a program guide in the usual program guide G3, a pin is displayed on each channel, and when the pin (pin image) of a dynamic channel is pressed, the dynamic channel at which the pin is pressed is a newly fixed channel. When the usual program guide G3 is opened next time, the priority of the newly fixed channel is higher than that of the dynamic channel, and it moves above the dynamic channel, for example, to the top of the usual program guide G3.

In the usual program guide G3, there are a fixed channel (fixed CH) and a dynamic channel (dynamic CH), and the fixed channel and the dynamic channel can be switched. The fixed channel is a channel (content) added or set by the user. The dynamic channel is a channel (content) that dynamically changes in the logic of the "usual program". In the usual program guide G3, for example, a UI image (for example, a UI image having a different color) that enables determination of whether a channel is the fixed channel or the dynamic channel is displayed.

As illustrated in FIG. 20, when a pin of a fixed channel is pressed in the usual program guide G3, the fixed channel at which the pin is pressed is a newly dynamic channel. When the usual program guide G3 is opened next time, the new dynamic channel is lower than the fixed channel, and moves under the fixed channel, for example, under the fixed channel and to the top of the dynamic channel group.

In addition, as illustrated in FIG. 21 (upper stage), in the usual program guide G3, for example, when a deletion operation is performed using a remote controller in a state where a dynamic channel is selected, the selected dynamic channel is deleted from the usual program guide G3. Note that the fixed channel may be deleted by a similar operation.

As illustrated in FIG. 21 (lower part), in a filter other than the usual filter, for example, when an addition operation is performed using a remote controller in a state where a channel (content) is selected, the selected channel is added to the usual program guide G3. At this time, the selected channel may also be added to favorites.

As described above, in the usual program guide G3 (or preference program guide G6), the order of the selection candidate contents, which is an example of the selection candidates, is changed by the user operation. In addition, the selection candidate content is added or deleted by a user operation. That is, since the user can customize the usual program guide G3 (or the preference program guide G6) by sorting, deleting, or adding, for example, the selection candidate contents in the usual program guide G3 (or the preference program guide G6), the user can create the usual program guide G3 (or the preference program guide G6) based on the user's preference. As a result, it is easier for the user to select the content desired by the user, so that the user can view the content desired by the user more reliably, and, as a result, the convenience of the user can be improved.

3-4. Highlight Display of TV Menu

Figure 22:
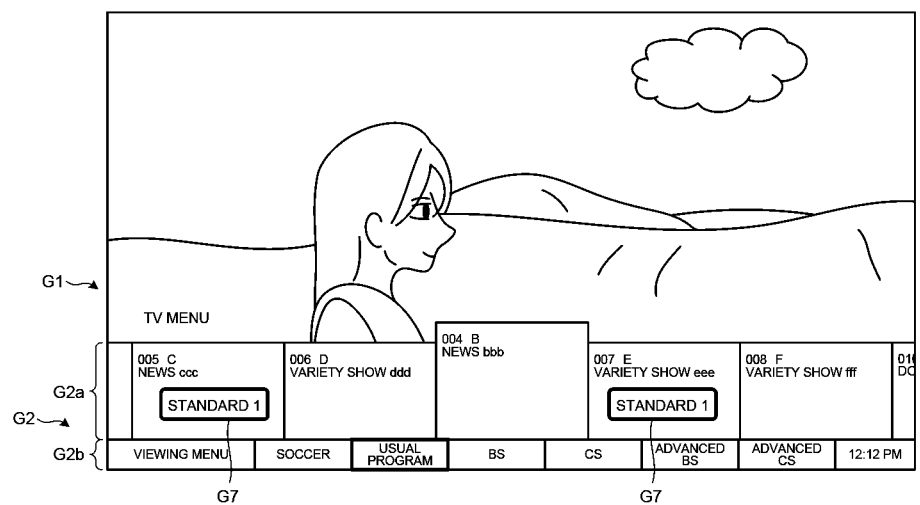
FIG. 22 is a first diagram for describing a highlight display of a TV menu according to another embodiment.
Figure 23:
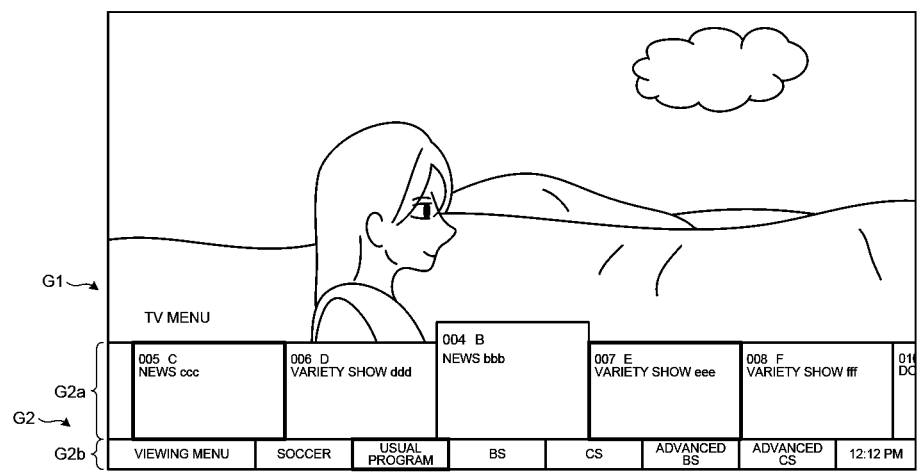
FIG. 23 is a second diagram for describing a highlight display of a TV menu according to another embodiment.

Next, the highlight display of a TV menu according to another embodiment will be described with reference to FIGS. 22 and 23. FIG. 22 is a first diagram for describing a highlight display of a TV menu according to another embodiment. FIG. 23 is a second diagram for describing a highlight display of a TV menu according to another embodiment.

In a case where a plurality of broadcast standards is juxtaposed, there is a case where the same content (program) is broadcast in a new high-quality service with higher utilization efficiency of the radio band and an old service with reduced allocation of the radio band. In addition, according to an operation situation, there is a program transmitted only by a new broadcast standard while there is a program transmitted only by an old broadcast standard. Since it is possible to present the user with the content by distinguishing them by the highlight display, it is easier for the user to select the content desired by the user, and it is possible to view the content desired by the user more reliably. As a result, user convenience can be improved.

For example, as illustrated in FIG. 22, an icon (for example, "standard 1") G7 indicating the broadcast standard is displayed in an item image corresponding to the content that is required to clearly indicate the broadcast standard among the item images of the TV menu G2. The content that is required to clearly indicate the broadcast standard is, for example, a content whose content is the same but that is broadcast in a different broadcast standard. Furthermore, other than the icon, for example, as illustrated in FIG. 23, a color of the edge of the item image corresponding to the content which is required to clearly indicate the broadcast standard among the respective item images of the TV menu G2 may be changed to a conspicuous color (for example, red) and highlighted.

As described above, in the TV menu G2, the item image corresponding to the specific content is highlighted. For example, the item image corresponding to the content broadcasted in a specific broadcast standard according to the difference in the broadcast standards is highlighted. In this manner, it is possible to present the user with the content by differentiate the broadcast standard of the content. As a result, it is easier for the user to select the content desired by the user, so that the user can view the content desired by the user more reliably, and, as a result, the convenience of the user can be improved.

Note that, in a case where the same content can be acquired in a plurality of broadcast standards at the same time, the content based on a newer broadcast standard (which transmits high-quality content) may be preferentially selected. This may be performed in both cases of selecting a channel with a usual filter and selecting a channel normally. For example, the high-quality content is a content corresponding to a high resolution (4K/8K or the like), a high bit depth (high bit rate), a high luminance (HDR or the like), a high frame rate (HFR or the like), and a high color gamut. In addition, a filter name capable of selecting a first broadcast standard of a second broadcast standard older than the first broadcast standard may be added as a filter name displayed in the TV menu G2.

Furthermore, in a case where the same content can be acquired in a plurality of broadcast standards at the same time, a description or an icon indicating that the program is transmitted in a plurality of standards may be displayed on the TV menu G2 (for example, a mini-program guide) or the EPG, or a method of displaying the TV menu G2 or the EPG may be changed according to the standard. The display of the description and the icon, and a change in display method may be indicated only for the content with a standard different from the currently selected broadcast standard, or may indicated only for the content with a standard corresponding to a newer standard (transmitting high-quality content).

Furthermore, whether it is possible to acquire the same content in a plurality of broadcast standards at the same time may be determined based on broadcast metadata transmitted in one or both of a broadcast wave (broadcast stream) of a first (new or old) broadcast standard and a broadcast stream of a second (old or new) broadcast standard. The broadcast metadata included in the broadcast stream of the first broadcast standard may include information (for example, an identifier or a flag) indicating whether the same content is transmitted in the broadcast stream of the second broadcast standard (the first and the second may be reversed). The broadcast metadata is information used for broadcast scanning, and the receiver may create a list of receivable channel information according to the broadcast metadata. Furthermore, the list may be displayed on the screen as, for example, an EPG or a TV menu.

Here, the broadcast metadata may be distributed by communication. That is, the communication metadata is completely or almost the same as the broadcast metadata. As the communication metadata, data obtained by adding information about the broadcast content to a description related to the Internet content (communication content) may be distributed by communication. This may be completely different from the broadcast metadata. The broadcast content(s) and the communication content(s) may be compared, and the highest quality content may be preferentially selected. This may be performed in either case of tuning to a usual channel or normal tuning. In addition, the broadcast content may be prioritized in consideration of a delay problem or the like, or a frequently used source may be preferentially selected. The high-quality content may be determined based on only one of a resolution, a bit depth (bit rate), a luminance, a frame rate, and a color gamut, may be determined based on a plurality of them, or may be determined based on a delay, broadcast reception sensitivity, a communication line speed, or the like.

Further, each communication content may be designated by an Internet content identifier. In addition, each communication content may include a broadcast recording content and a communication-downloaded content. After the same contents are collectively displayed, an icon indicating a distribution source, an icon indicating contents in broadcast, and an icon indicating recorded contents may be displayed to indicate from which source the contents can be acquired.

Note that, in each of the above embodiments, the description has been mainly made based on the moving image content of the broadcast program or the like as a content to be searched for and executed, but the content type is not restricted as long as the content can be executed by a device or equipment realized by the present disclosure. For example, the content to be played back may be a voice content (for example, music), and the music is played back by an application executable by the information processing device 100. Furthermore, the target to be searched for based on the priority may be a voice content or an application by which the voice content is played back. In this case, one piece of music or an application is selected based on a procedure similar to any of the above-described embodiments or a combination thereof, music or applications that has not been selected is set as selection candidates, and a TV menu corresponding to the selection candidates is displayed on the display 108. For example, an album art image (jacket image) of music as the selected content, a user interface image of an application, and the like are displayed on the display 108. The channel described in each of the above embodiments may be a channel such as a radio or a music distribution station that broadcasts a voice content such as music. The same procedure is applied to other types of contents such as a still image content and web page.

Note that, for the usual program guide G3 and the preference program guide G6 described in each of the above embodiments, the full-screen program guide may be displayed in a state in which the usual filter or each genre filter is selected even when the program guide display is requested based on the pressing operation of the program guide button of the remote controller or the voice input. In addition, the program guide may be displayed in a state in which the usual filter or each genre filter is selected only at the time of transition from the TV menu. In a case where the full-screen program guide is displayed without going through the TV menu G2, the full-screen program guide may be displayed in a state in which the filter of the content source (for example, terrestrial digital broadcasting) being viewed is selected. Whether to preferentially display the usual program guide G3 or preference program guide G6 when not going through the TV menu G2 may be selected by the user on a setting screen or the like illustrated in FIG. 11. In addition, in order to preferentially display the usual program guide G3 and the preference program guide G6, a dedicated button may be provided on the remote controller, or a predetermined request operation (for example, continuous pressing of a program guide button or utterance such as "open the usual program guide") may be received using a remote controller input, a voice input, a gesture input, or the like.

Although the embodiments have been described in detail with reference to the accompanying drawings, the present technology is not limited to such examples. Respective embodiments may be implemented in combination. It is obvious that those skilled in the art in the technical field of the present disclosure can find various revisions and modifications within the scope of a technical concept described in claims, and it should be understood that these revisions and modifications will also be naturally come under the technical scope of the present disclosure.

For example, it is also possible to create a computer program for causing hardware such as a CPU, a ROM, and a RAM built in the information processing device 100 to exhibit the functions of the information processing device 100. Furthermore, a computer-readable storage medium storing the computer program is also provided.

Note that the effects described in the present specification are merely illustrative or exemplified effects, and are not limitative. That is, the technology according to the present disclosure can accomplish other effects apparent to those skilled in the art from the description of the present specification, in addition to or instead of the effects described above.

4. Supplementary Note

The present technology may also be configured as below.

(1) An information processing device comprising:
   a control unit configured to perform
   a process of acquiring content selection information about a user,
   a process of determining a display content and content selection candidate information based on the content selection information, and
   a process of outputting the display content and a first display image corresponding to the selection candidate information.

(2) The information processing device according to the (1), wherein
   the first display image is created based on one or both of a service and a content used by a user within a predetermined period.

(3) The information processing device according to the (1) or (2), wherein the first display image changes according to one or both of a time zone and a day of the week.
(4) The information processing device according to any one of the (1) to (3), wherein
the first display image includes a plurality of pieces of selectable category information corresponding to a content acquisition means or a content type.
(5) The information processing device according to the (4), wherein
the control unit performs a process of outputting a second display image corresponding to selection candidate information about the content according to the category information based on user selection corresponding to the category information.
(6) The information processing device according to the (5), wherein
content selection candidates are disposed in an order based on the content selection information in the second display image.
(7) The information processing device according to any one of the (1) to (6), wherein
content selection candidates are disposed in an order based on the content selection information in the first display image.
(8) The information processing device according to any one of the (1) to (7), wherein
the control unit performs a process of switching from an output of the display content and the first display image to an output for displaying a third display image corresponding to a content information interface on an entire screen based on a user operation on the first display image.
(9) The information processing device according to the (8), wherein
the first display image and the third display image include selectable category information at corresponding positions.
(10) The information processing device according to the (8) or (9), wherein
content selection candidates are disposed in an order based on the content selection information in the third display image.
(11) The information processing device according to any one of the (8) to (10), wherein
the first display image or the third display image includes lower category information related to an element included in a content.
(12) The information processing device according to the (11), wherein
the first display image or the third display image includes at least one of an illustration, a photograph, or an explanatory sentence related to an element included in a content.
(13) The information processing device according to any one of the (10) to (12), wherein
the selection candidate is added and recommended based on the content selection information in the first display image or the third display image.
(14) The information processing device according to any one of the (10) to (13), wherein
the selection candidate is changed in an order, added, or deleted by a user operation in the third display image.
(15) The information processing device according to any one of the (1) to (14), wherein the control unit determines whether to display the display content or the first display image based on a usage condition of the information processing device.
(16) The information processing device according to the (15), wherein
the control unit determines whether to display the display content or the first display image based on an elapsed time from a previous activation of the information processing device.
(17) The information processing device according to any one of the (1) to (16), wherein
the control unit performs
a process of outputting setting information for selecting to display a display content selected based on the content selection information at a time of activation, and
a process of displaying a display content selected based on the content selection information at a time of activation based on user selection for the setting information.
(18) The information processing device according to any one of the (1) to (17), wherein
the control unit performs
a process of acquiring a content output instruction related to the content selection information, and
a process of determining the display content and the selection candidate information when the content output instruction is acquired.
(19) The information processing device according to the (18), wherein
the content output instruction is an utterance of a user, and
the control unit performs
a process of acquiring, based on an utterance of the user, content selection information corresponding to the user who has made the utterance, and
a process of determining the display content and the selection candidate information based on the acquired content selection information.
(20) An information processing method executed by a computer, the method comprising:
a process of acquiring content selection information about a user;
a process of determining a display content and content selection candidate information based on the content selection information; and
a process of outputting the display content and a first display image corresponding to the selection candidate information.

REFERENCE SIGNS LIST

100 INFORMATION PROCESSING DEVICE
102 MICROPHONE
103 INPUT DEVICE
104 COMMUNICATION I/F (INTERFACE)
105 MEMORY
106 TUNER
107 DECODER
108 DISPLAY
112 PROCESSOR
120 VOICE ACQUISITION UNIT
130 VOICE RECOGNITION UNIT
140 FEATURE DATABASE (DB)
150 APPLICATION UNIT
160 CONTROL UNIT

162 SEARCH CONTROL UNIT
164 SELECTION CONTROL UNIT
166 DISPLAY CONTROL UNIT
172 HISTORY DB (DATABASE)
174 PREFERENCE DB (DATABASE)
G1 IMAGE OF DISPLAY CONTENT
G2 TV MENU
G3 USUAL PROGRAM GUIDE
G4 SETTING IMAGE
G5 SETTING IMAGE
G6 PREFERENCE PROGRAM GUIDE

The invention claimed is:

1. An information processing device comprising:
circuitry configured to;
acquire content selection information about a user,
determine a display content and content selection candidate information based on the content selection information, and
output the display content and a first display image corresponding to the content selection candidate information,
wherein the circuitry is further configured to determine whether to display the display content or the first display image based on an elapsed time from a previous activation of the information processing device.

2. The information processing device according to claim 1, wherein
the first display image is created based on one or both of a service and a content used by the user within a predetermined period.

3. The information processing device according to claim 1, wherein
the first display image changes according to one or both of a time zone and a day of the week.

4. The information processing device according to claim 1, wherein
the first display image includes a plurality of pieces of selectable category information corresponding to a content acquisition means or a content type.

5. The information processing device according to claim 4, wherein
the circuitry further configured to output a second display image corresponding to the content selection candidate information according to the selectable category information based on user selection corresponding to the selectable category information.

6. The information processing device according to claim 5, wherein
content selection candidates are disposed in an order based on the content selection information in the second display image.

7. The information processing device according to claim 1, wherein
content selection candidates are disposed in an order based on the content selection information in the first display image.

8. The information processing device according to claim 1, wherein
the circuitry further configured to switch from an output of the display content and the first display image to an output for displaying a third display image corresponding to a content information interface on an entire screen based on a user operation on the first display image.

9. The information processing device according to claim 8, wherein
the first display image and the third display image include selectable category information at corresponding positions.

10. The information processing device according to claim 8, wherein
content selection candidates are disposed in an order based on the content selection information in the third display image.

11. The information processing device according to claim 8, wherein
the first display image or the third display image includes lower category information related to a first element included in a first content.

12. The information processing device according to claim 11,
wherein
the first display image or the third display image includes at least one of an illustration, a photograph, or an explanatory sentence related to a second element included in a second content.

13. The information processing device according to claim 10,
wherein
a selection candidate is added and recommended based on the content selection information in the first display image or the third display image.

14. The information processing device according to claim 10,
wherein
a selection candidate is changed in an order, added, or deleted by some user operation in the third display image.

15. The information processing device according to claim 1, wherein
the circuitry further configured to determine whether to display the display content or the first display image based on a usage condition of the information processing device.

16. The information processing device according to claim 1, wherein
the first display image is created based on a channel used by the user within a predetermined period.

17. The information processing device according to claim 1, wherein
the circuitry further configured to:
output setting information for selecting to display some display content selected based on the content selection information at a time of activation, and
display other display content selected based on the content selection information at some time of activation based on user selection for the setting information.

18. The information processing device according to claim 1, wherein
the circuitry further configured to:
acquire a content output instruction related to the content selection information, and
determine the display content and the content selection candidate information when the content output instruction is acquired.

19. The information processing device according to claim 18,
wherein
the content output instruction is an utterance of the user, and
the circuitry further configured to:

acquire, based on an utterance of the user, content selection information corresponding to the user who has made the utterance, and determine the display content and the content selection candidate information based on the acquired content selection information.

20. An information processing method comprising:

acquiring content selection information about a user;

determining a display content and content selection candidate information based on the content selection information;

outputting the display content and a first display image corresponding to the content selection candidate information, determining whether to display the display content or the first display image based on an elapsed time from a previous activation event.

* * * * *